US012413459B2

(12) United States Patent
Medina Acosta et al.

(10) Patent No.: US 12,413,459 B2
(45) Date of Patent: Sep. 9, 2025

(54) METHODS, NETWORK NODE, WIRELESS DEVICE, MEDIA FOR 16-QAM BASED COMMUNICATION

(71) Applicant: Telefonaktiebolaget LM Ericsson (publ), Stockholm (SE)

(72) Inventors: Gerardo Agni Medina Acosta, Märsta (SE); Liping Zhang, Beijing (CN); Jie Chen, Beijing (CN); Yuan Wang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 310 days.

(21) Appl. No.: 17/920,550

(22) PCT Filed: Apr. 22, 2021

(86) PCT No.: PCT/EP2021/060530
§ 371 (c)(1),
(2) Date: Oct. 21, 2022

(87) PCT Pub. No.: WO2021/214218
PCT Pub. Date: Oct. 28, 2021

(65) Prior Publication Data
US 2023/0188393 A1    Jun. 15, 2023

(30) Foreign Application Priority Data
Apr. 22, 2020   (WO) ................ PCT/CN2020/086216

(51) Int. Cl.
*H04L 27/20*   (2006.01)
*H04L 5/00*    (2006.01)
*H04L 27/34*   (2006.01)

(52) U.S. Cl.
CPC .......... *H04L 27/206* (2013.01); *H04L 5/0092* (2013.01); *H04L 5/0094* (2013.01); *H04L 27/34* (2013.01)

(58) Field of Classification Search
CPC ..... H04L 27/206; H04L 27/34; H04L 5/0092; H04L 5/0094
(Continued)

(56) References Cited
U.S. PATENT DOCUMENTS

2011/0075684 A1    3/2011  Zeng et al.
2019/0132079 A1*   5/2019  Saito .................... H04L 1/0011
(Continued)

FOREIGN PATENT DOCUMENTS

CN    105557050 A    5/2016
CN    108702744 A    10/2018
(Continued)

OTHER PUBLICATIONS

Chinese Notice of Allowance and English Translation dated Aug. 13, 2024 for Application No. 202180044514.5, consisting of 9 pages.
(Continued)

Primary Examiner — Kevin M Burd
(74) Attorney, Agent, or Firm — Weisberg I.P. Law, P.A.

(57) ABSTRACT

Methods, a network node, a wireless device, and computer readable storage medium for 16-QAM based communication are disclosed. A method includes: determining a resource allocation for 16-QAM based communication for the wireless device; and indicating, to the wireless device, a TBS and/or a number of allocated time-domain resources that are associated with the determined resource allocation using a TBS index and a time-domain resource index, wherein the TBS index and the time-domain resource index are determined in accordance with a table for allocating (Continued)

transport blocks and/or number of allocated time-domain resources for the 16-QAM based communication.

20 Claims, 10 Drawing Sheets

(58) Field of Classification Search
USPC .......................................................... 375/262
See application file for complete search history.

(56) References Cited

U.S. PATENT DOCUMENTS

| | | | | |
|---|---|---|---|---|
| 2019/0149287 | A1* | 5/2019 | Cheng | H04L 1/0009 370/280 |
| 2020/0244392 | A1* | 7/2020 | Noh | H04L 1/0026 |

FOREIGN PATENT DOCUMENTS

| | | |
|---|---|---|
| CN | 110612695 A | 12/2019 |
| EP | 3297319 A1 | 3/2018 |
| WO | 2018085666 A1 | 5/2018 |

OTHER PUBLICATIONS

Chinese Office Action and English Translation dated Apr. 3, 2024 for Application No. 202180044514.5, consisting of 10 pages.

Naihua et al. "Discussion on E-DCH SPS Initial Link Adaptation Technology of TD-SCDMA HSPA+ CPC"; TD-Tech Co., Ltd., Beijing China, Jun. 2, 2010, consisting of 4 pages.

International Search Report and Written Opinion dated Jul. 1, 2021 for International Application No. PCT/EP2021/060530 filed Apr. 22, 2021, consisting of 11 pages.

3GPP TSG RAN WG Meeting #86 RP-192672; Title: Rel-17 16QAM support for NB-IoT; Source: MediaTek Inc.; Agenda Item: 10.1.1; Document for: Discussion and Decision; Date and Location: Dec. 9-12, 2019, Sitges, Spain, consisting of 4 pages.

3GPP TSG-RAN WG1 Meeting #102-e R1-2005557; Title: Support of 16-QAM for unicast in UL and DL in NB-IoT; Source: Ericsson; Agenda Item: 8.9.1; Document for Discussion and Decision; Date and Location: Aug. 17-28, 2020, e-meeting. consisting of 12 pages.

3GPP TS 36.212 V16.0.0; 3rd Generation Partnership Project; Technical Specification Group Radio Access Network; Evolved Universal Terrestrial Radio Access (E-UTRA); Multiplexing and channel coding (Release 16); Dec. 2019; consisting of 250 pages.

3GPP TS 36.213 V16.0.0; 3rd Generation Partnership Project; Technical Specification Group Radio Access Network; Evolved Universal Terrestrial Radio Access (E-UTRA); Physical layer procedures (Release 16); Dec. 2019; consisting of 568 pages.

3GPP TSG RAN Meeting #86 RP-193264; Title: New WID on Rel-17 enhancements for NB-IoT and LTE-MTC; Source: Huawei, HiSilicon; Agenda Item: 10.1.1; Document for: Approval; Date and Location: Dec. 9-12, 2019, Sitges, Spain, consisting of 5 pages.

\* cited by examiner

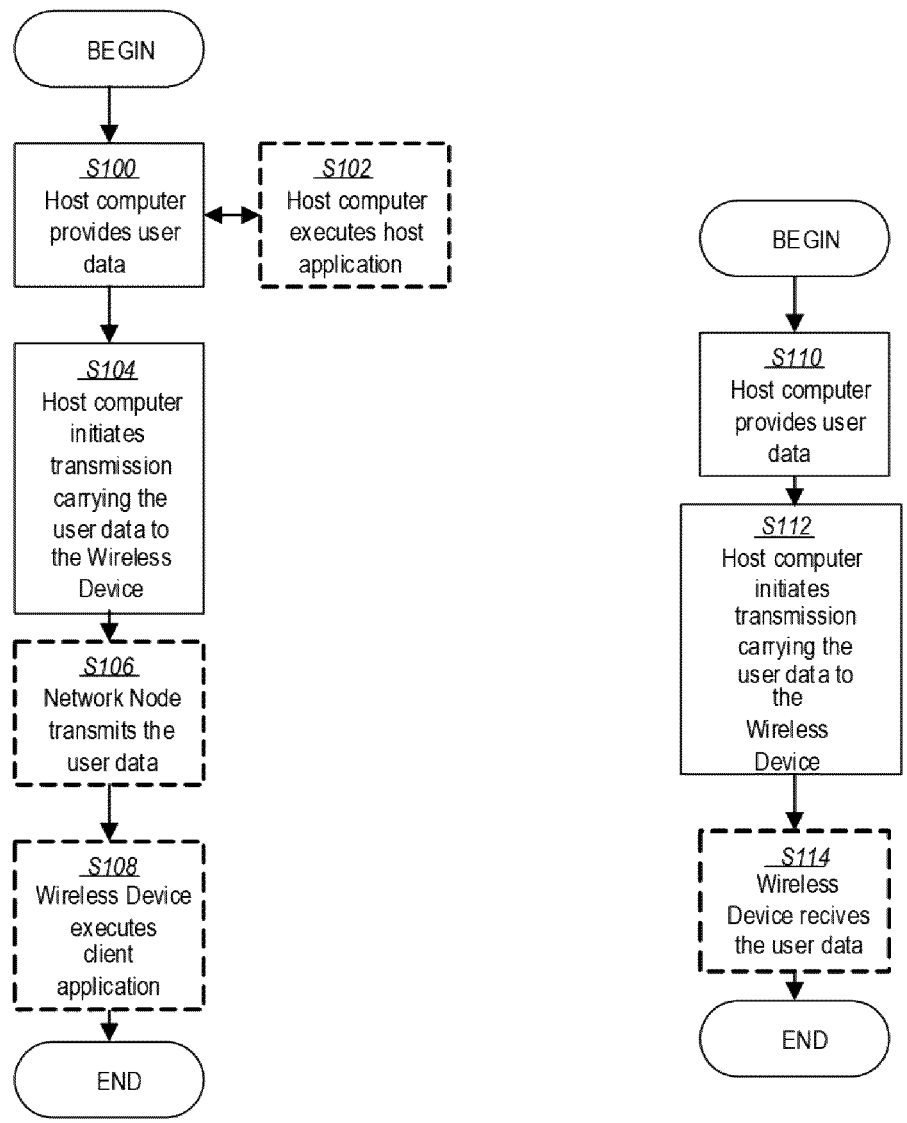

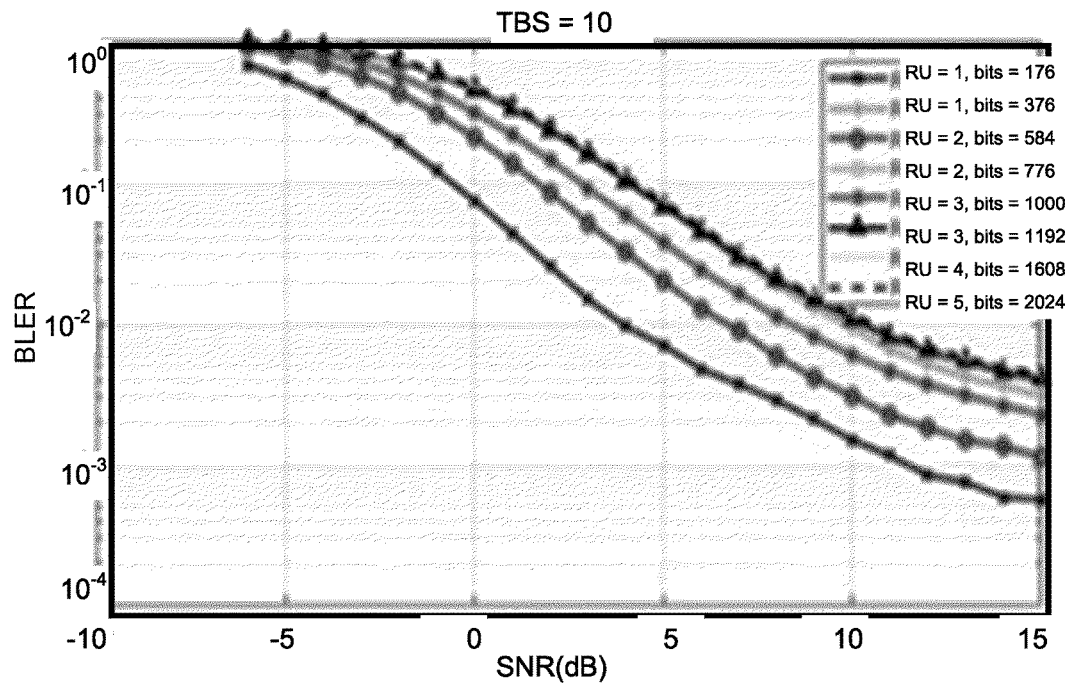
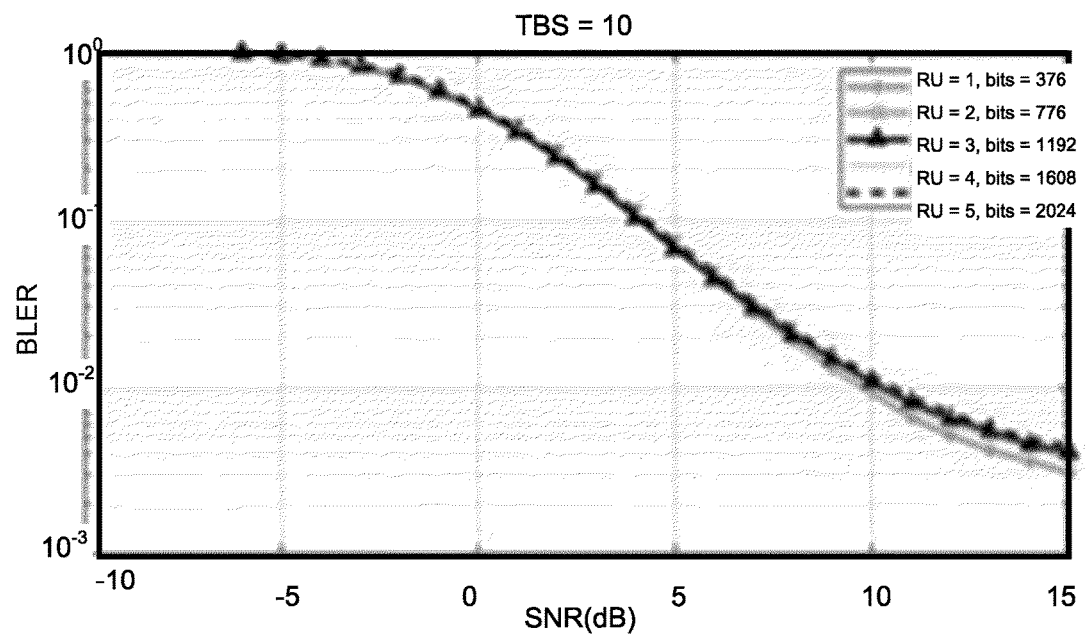
FIG. 9

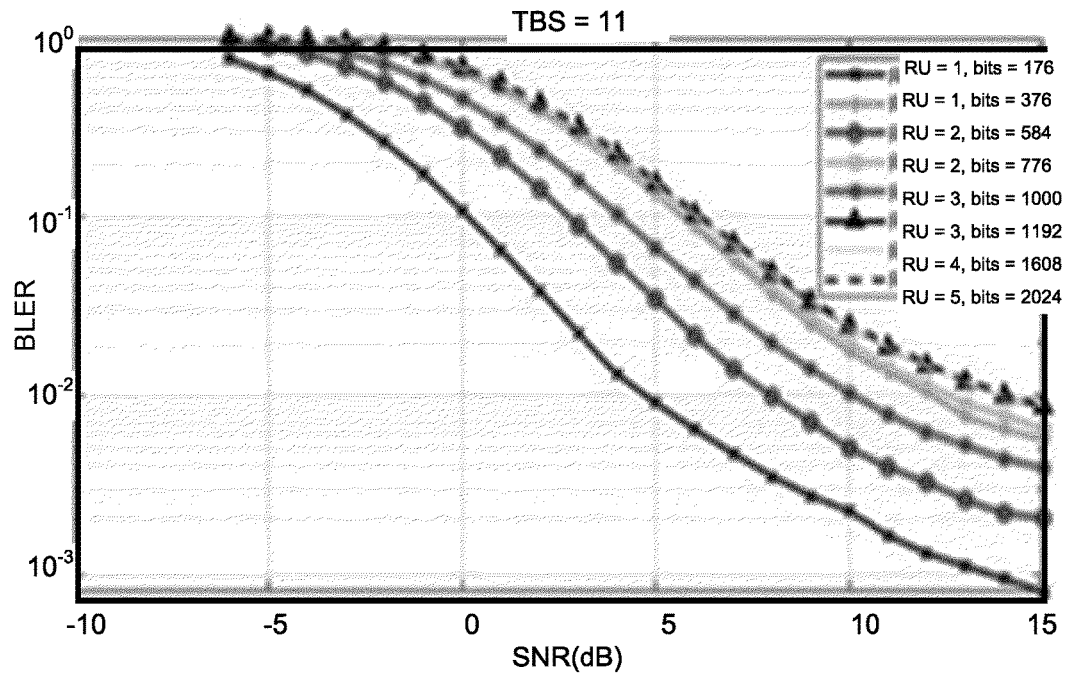
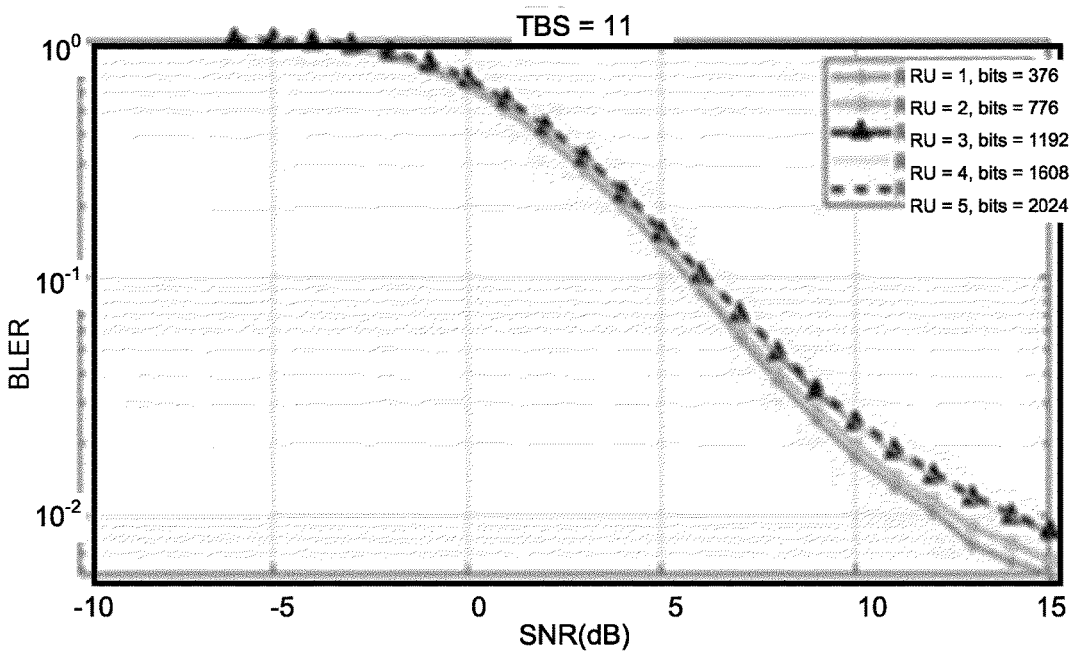
FIG. 10

METHODS, NETWORK NODE, WIRELESS DEVICE, MEDIA FOR 16-QAM BASED COMMUNICATION

CROSS-REFERENCE TO RELATED APPLICATIONS

This application is a Submission Under 35 U.S.C. § 371 for U.S. National Stage Patent Application of International Application No.: PCT/EP2021/060530, filed Apr. 22, 2021 entitled "METHODS, NETWORK NODE, WIRELESS DEVICE, MEDIA FOR 16-QAM BASED COMMUNICATION," which claims priority to International Application No.: PCT/CN2020/086216 filed Apr. 22, 2020, the entireties of both of which are incorporated herein by reference.

TECHNICAL FIELD

The present disclosure relates to wireless communications, and in particular, to methods, a network node, a wireless device, computer readable storage media for 16-quadrature amplitude modulation (16-QAM) based communication based on at least one of time-domain resource assignment rearrangement and transport block redistribution.

BACKGROUND

At the radio access network (RAN) plenary meeting #86 (RP-193264), a new Work Item (WI) entitled "Rel-17 enhancements for NB-IoT and LTE-MTC" was discussed. In the Work Item Description (WID) one of the objectives is described as follows:
  Specify 16-quadurature amplitude modulation (QAM) for unicast in uplink (UL) and downlink (DL), including necessary changes to DL power allocation for narrowband physical downlink shared channel (NPDSCH) and DL transport block size (TBS). This is to be specified without a new NB-IoT UE category. For DL, increase in maximum TBS of, e.g., 2× the third generation partnership project (3GPP) Release 16 (Rel-16) maximum, and soft buffer size may be specified by modifying at least existing Category NB2. For UL, the maximum TBS is not increased. [NB-IoT] [RAN1, RAN4]

How the "Modulation and coding scheme, resource assignment and TBS allocation" is performed in NB-IoT in both the UL and the DL is described below, starting with the latter.

Modulation and Coding Scheme, Resource Assignment and TBS Allocation for Narrowband Internet of Things (NB-IoT) in DL In accordance with one or more wireless communication standards such as 3GPP technical specification (TS) 36.213 v16.0.0, the existing available modulation order is $Q_m=2$ (i.e., quadrature phase shift keying (QPSK)), and within the context of transmitting wireless device (i.e., UE) data, in the DL, the transport block size (TBS) on NPDSCH is determined as follows:
  the wireless device may first,
    read the 4-bit "modulation and coding scheme" field ($I_{MCS}$) in the downlink control information (DCI) and set $I_{TBS}=I_{MCS}$
  and second,
    read the 3-bit "resource assignment" field ($I_{SF}$) in the DCI and determine its TBS by the procedure in Subclause 16.4.1.5.1 of, for example, 3GPP TS 36.213 v16.0.0.

The resource allocation information in DCI format N1, N2 (paging) for NPDSCH indicates to a scheduled wireless device:
  a number of subframes ($N_{SF}$) determined by the resource assignment field ($I_{SF}$) in the corresponding DCI according to Table 16.4.1.3-1 of, for example, 3GPP TS 36.213 v16.0.0.
  a repetition number ($N_{Rep}$) determined by the repetition number field ($I_{Rep}$) in the corresponding DCI according to Table 16.4.1.3-2 of, for example, 3GPP TS 36.213 v16.0.0.

TABLE 16.4.1.3-1 of, for example, 3GPP TS 36.213 v16.0.0:
Number of subframes ($N_{SF}$) for NPDSCH

| $I_{SF}$ | $N_{SF}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

TABLE 16.4.1.3-2 of, for example, 3GPP TS 36.213 v16.0.0:
Number of repetitions ($N_{Rep}$) for NPDSCH

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |

In relation with the above, a Cat-NB2 device can support in DL a TBS up to 2536 bits. The TBS is given by the ($I_{TBS}$, $I_{SF}$) entry in Table 16.4.1.5.1-1 of, for example, 3GPP TS 36.213 v16.0.0.

TABLE 16.4.1.5.1-1 of, for example, 3GPP TS 36.213
v16.0.0: Transport block size (TBS) table

| | $I_{SF}$ | | | | | | | |
|---|---|---|---|---|---|---|---|---|
| $I_{TBS}$ | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1032 |
| 7 | 104 | 224 | 328 | 472 | 584 | 680 | 968 | 1224 |

TABLE 16.4.1.5.1-1-continued of, for example, 3GPP TS 36.213
v16.0.0: Transport block size (TBS) table

| $I_{TBS}$ | $I_{SF}$ | | | | | | | |
|---|---|---|---|---|---|---|---|---|
| | 0 | 1 | 2 | 3 | 4 | 5 | 6 | 7 |
| 8 | 120 | 256 | 392 | 536 | 680 | 808 | 1096 | 1352 |
| 9 | 136 | 296 | 456 | 616 | 776 | 936 | 1256 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1032 | 1256 | 1544 | 2024 | 2536 |

Modulation and Coding Scheme, Resource Assignment and TBS Allocation for NB-IoT in UL The NPUSCH Format 1 transmission using a 15 KHz subcarrier spacing can be scheduled to use a single-tone ($\pi/2$-BPSK, $\pi/4$-QPSK) or a multi-tone allocation (QPSK) consisting of either 3, 6, or 12 subcarriers. Moreover, in the time domain, a given TBS can be mapped over one or more resource units. In accordance with wireless communication standards such as 3GPP TS 36.213 v16.0.0, to determine the modulation order, redundancy version and transport block size for NPUSCH, the following procedure may be followed:

The wireless device may first
- read the "modulation and coding scheme" field ($I_{MCS}$) in the DCI or configured by higher layers for narrowband physical uplink shared channel (NPUSCH) transmission using preconfigured uplink resource, and
- a read the "redundancy version" field ($rv_{DCI}$) in the DCI, and
- read the "resource assignment" field ($I_{RU}$) in the DCI or configured by higher layers for NPUSCH transmission using preconfigured uplink resource, and
- compute the total number of allocated subcarriers ($N_{sc}^{RU}$), number of resource units ($N_{RU}$), and repetition number ($N_{Rep}$) according to Subclause 16.5.1.1 of, for example, 3GPP TS 36.213 v16.0.0.

..., the wireless device may use modulation order, $Q_m=2$ if $N_{sc}^{RC}>1$. The wireless device may use $I_{MCS}$ and Table 16.5.1.2-1 of, for example, 3GPP TS 36.213 v16.0.0, to determine the modulation order to use for NPUSCH if $N_{sc}^{RU}=1$.

For NPUSCH transmission with subcarrier spacing $\Delta f=15$ kHz, the subcarrier indication field ($I_{sc}$) in the DCI determines the set of contiguously allocated subcarriers ($n_{sc}$) according to Table 16.5.1.1-1 of, for example, 3GPP TS 36.213 v16.0.0.

TABLE 16.5.1.1-1 of, for example, 3GPP TS 36.213 v16.0.0:
Allocated subcarriers for NPUSCH with $\Delta f = 15$ kHz

| Subcarrier indication field ($I_{sc}$) | Set of Allocated subcarriers ($n_{sc}$) |
|---|---|
| 0-11 | $I_{sc}$ |
| 12-15 | $3(I_{sc} - 12) + \{0, 1, 2\}$ |
| 16-17 | $6(I_{sc} - 16) + \{0, 1, 2, 3, 4, 5\}$ |
| 18 | $\{0, 1, 2, 3, 4, 5, 6, 7, 8, 9, 10, 11\}$ |
| 19-63 | Reserved |

TABLE 16.5.1.1-2 of, for example, 3GPP TS 36.213 v16.0.0:
Number of resource units ($N_{RU}$) for NPUSCH

| $I_{RU}$ | $N_{RU}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

TABLE 16.5.1.1-3 of, for example, 3GPP TS 36.213 v16.0.0:
Number of repetitions ($N_{Rep}$) for NPUSCH

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

In relation with the above, a Cat-NB2 device can support in UL a TBS up to 2536 bits. The wireless communication standards such as 3GPP TS 36.213 v16.0.0 states that the wireless device may use ($I_{TBS}$, $I_{RU}$) and Table 16.5.1.2-2 to determine the TBS to use for the NPUSCH. $I_{TBS}$ is given in Table 16.5.1.2-1 if $N_{sc}^{RU}=1$, $I_{TBS}=I_{MCS}$ otherwise.

TABLE 16.5.1.2-2

Transport block size (TBS) table for NPUSCH

| $I_{TBS}$ | $I_{RU}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1000 |
| 7 | 104 | 224 | 328 | 472 | 584 | 712 | 1000 | 1224 |
| 8 | 120 | 256 | 392 | 536 | 680 | 808 | 1096 | 1384 |
| 9 | 136 | 296 | 456 | 616 | 776 | 936 | 1256 | 1544 |
| 10 | 144 | 328 | 504 | 680 | 872 | 1000 | 1384 | 1736 |
| 11 | 176 | 376 | 584 | 776 | 1000 | 1192 | 1608 | 2024 |
| 12 | 208 | 440 | 680 | 1000 | 1128 | 1352 | 1800 | 2280 |
| 13 | 224 | 488 | 744 | 1032 | 1256 | 1544 | 2024 | 2536 |

SUMMARY

Some embodiments advantageously provide methods, systems, and apparatuses for supporting/implementing 16-quadrature amplitude modulation (16-QAM) based communication based on at least one of: time-domain resource assignment rearrangement, and transport block redistribution.

One or more embodiments of the present disclosure focus on Time-Domain Resource Assignment rearrangements and Transport Blocks redistribution to support 16-QAM for unicast in UL and DL.

According to a first aspect of the present disclosure, a method performed by a network node configured to communicate with a wireless device is provided. The method includes: determining a resource allocation for 16-QAM based communication for the wireless device; and indicating, to the wireless device, a TBS and/or a number of allocated time-domain resources that are associated with the determined resource allocation using a TBS index and a time-domain resource index, wherein the TBS index and the time-domain resource index are determined in accordance with a table for allocating transport blocks and/or number of allocated time-domain resources for the 16-QAM based communication, wherein the table for allocating transport blocks and/or number of allocated time-domain resources for the 16-QAM based communication corresponds to at least one of: a time-domain resource assignment (TDRA) rearrangement with respect to a table for allocating transport blocks and/or number of allocated time-domain resources defined for a QPSK based communication, and a transport block redistribution with respect to the table for allocating transport blocks and/or number of allocated time-domain resources defined for the QPSK based communication.

In an exemplary embodiment, the table for allocating transport blocks and/or number of allocated time-domain resources for the 16-QAM based communication corresponds to the TDRA rearrangement with respect to the table for allocating transport blocks and/or number of allocated time-domain resources defined for the QPSK based communication, and the TBS is indicated using the TBS index and the time-domain resource index that is corresponding to a reduced number of allocated time-domain resources compared to a number of allocated time-domain resources corresponding to the same TBS as required in the table for allocating transport blocks and/or number of allocated time-domain resources defined for the QPSK based communication.

In an exemplary embodiment, the method further includes: transmitting, to the wireless device, an indication to use 16-QAM.

In an exemplary embodiment, the table for allocating transport blocks and/or number of allocated time-domain resources for the 16-QAM based communication corresponds to the TDRA rearrangement and the transport block redistribution with respect to the table for allocating transport blocks and/or number of allocated time-domain resources defined for the QPSK based communication, and the TBS is indicated using the TBS index and the time-domain resource index that are respectively different from those indicating the same TBS as required in the table for allocating transport blocks and/or number of allocated time-domain resources defined for the QPSK based communication, wherein the time-domain resource index corresponds to a reduced number of allocated time-domain resources compared to a number of allocated time-domain resources corresponding to the same TBS as required in the table for allocating transport blocks and/or number of allocated time-domain resources defined for the QPSK based communication.

In an exemplary embodiment, the time-domain resource index corresponds to the reduced number of allocated time-domain resources by half compared to the number of allocated time-domain resources corresponding to the same TBS as required in the table for allocating transport blocks and/or number of allocated time-domain resources defined for the QPSK based communication.

In an exemplary embodiment, the transport block redistribution with respect to the table for allocating transport blocks and/or number of allocated time-domain resources defined for the QPSK based communication includes:

one or more TBSs corresponding to a first subset of the TBS indices in the table for allocating transport blocks and/or number of allocated time-domain resources defined for the QPSK based communication being reused for the 16-QAM based communication but each being indicated by a TBS index and/or a time-domain resource index that are respectively different from those indicating the same TBS as required in the table for allocating transport blocks and/or number of allocated time-domain resources defined for the QPSK based communication; and optionally one or more TBSs in the table for allocating transport blocks and/or number of allocated time-domain resources defined for the QPSK based communication being skipped for the 16-QAM based communication, the one or more skipped TBSs corresponding to a second subset of TBS indices in the table for allocating transport blocks and/or number of allocated time-domain resources defined for the QPSK based communication; and optionally one or more TBSs corresponding to a third subset of the TBS indices in the table for allocating transport blocks and/or number of allocated time-domain resources defined for the QPSK based communication being used for the QPSK based communication.

In an exemplary embodiment, the table for allocating transport blocks and/or number of allocated time-domain resources for the 16-QAM based communication corresponds to the transport block redistribution with respect to the table for allocating transport blocks and/or number of allocated time-domain resources defined for the QPSK based communication, and the TBS is indicated using the TBS index and the time-domain resource index that are respectively different from those indicating the same TBS as required in the table for allocating transport blocks and/or number of allocated time-domain resources defined for the QPSK based communication.

In an exemplary embodiment, the transport block redistribution with respect to the table for allocating transport blocks and/or number of allocated time-domain resources defined for the QPSK based communication comprises:

one or more TBSs corresponding to a first subset of the TBS indices in the table for allocating transport blocks and/or number of allocated time-domain resources defined for the QPSK based communication being reused for the 16-QAM based communication but each being indicated by a TBS index and/or a time-domain resource index that are respectively different from those indicating the same TBS as required in the table for allocating transport blocks and/or number of allocated time-domain resources defined for the QPSK based communication; and optionally one or more TBSs in the table for allocating transport blocks and/or number of allocated time-domain resources defined for the QPSK based communication being skipped for the 16-QAM based communication, the one or more skipped TBSs corresponding to a second subset of TBS indices in the table for allocating transport blocks and/or number of allocated time-domain resources defined for the QPSK based communication; and optionally one or more TBSs corresponding to a third subset of the TBS indices in the table for allocating transport blocks and/or number of allocated time-domain resources defined for the QPSK based communication being used for the QPSK based communication.

In an exemplary embodiment, in a case where the 16-QAM based communication is used for uplink, the time-domain resource index corresponds to the number of allocated time-domain resource units.

In an exemplary embodiment, the method further includes: switching to a 16-QAM based uplink communication from a QPSK based uplink communication according to the determined resource allocation, in which the same TBS as that defined for the QPSK based uplink communication is allocated for the 16-QAM based uplink communication along with a reduced number of allocated time-domain resource units corresponding to the same TBS as required for allocating transport blocks and/or number of allocated time-domain resource units defined for the QPSK based uplink communication to reduce signal to noise ratio (SNR) variation between the QPSK based uplink communication and the 16-QAM based uplink communication.

In an exemplary embodiment, the method further includes: receiving a 16-QAM based uplink transmission from the wireless device, using a reduced number of allocated time-domain resource units compared to a number of allocated time-domain resource units corresponding to the same TBS as required for allocating transport blocks and/or number of allocated time-domain resource units defined for a QPSK based uplink communication.

In an exemplary embodiment, in a case where the 16-QAM based communication is used for downlink, the time-domain resource index corresponds to the number of allocated subframes.

In an exemplary embodiment, the method further includes: switching to a 16-QAM based downlink communication from a QPSK based downlink communication according to the determined resource allocation, in which the same TBS as that defined for the QPSK based downlink communication is allocated for the 16-QAM based downlink communication along with a reduced number of allocated subframes corresponding to the same TBS as required for allocating transport blocks and/or number of allocated subframes defined for the QPSK based downlink communication to reduce SNR variation between the QPSK based downlink communication and the 16-QAM based downlink communication.

In an exemplary embodiment, the method further includes: transmitting a 16-QAM based downlink transmission to the wireless device, using a reduced number of allocated subframes compared to a number of allocated subframes corresponding to the same TBS as required for allocating transport blocks and/or number of allocated subframes defined for a QPSK based downlink communication.

According to a second aspect of the present disclosure, a method performed by a wireless device configured to communicate with a network node is provided. The method includes: receiving, from the network node, indications of a TBS index and a time-domain resource index; determining a TBS and/or a number of allocated time-domain resources using the received TBS index and time-domain resource index in accordance with a table for allocating transport blocks and/or number of allocated time-domain resources for 16-QAM based communication to obtain a resource allocation for the 16-QAM based communication for the wireless device, wherein the table for allocating transport blocks and/or number of allocated time-domain resources for the 16-QAM based communication corresponds to at least one of: a time-domain resource assignment, TDRA, rearrangement with respect to a table for allocating transport blocks and/or number of allocated time-domain resources defined for a QPSK based communication, and a transport block redistribution with respect to the table for allocating transport blocks and/or number of allocated time-domain resources defined for the QPSK based communication.

In an exemplary embodiment, the table for allocating transport blocks and/or number of allocated time-domain resources for the 16-QAM based communication corresponds to the TDRA rearrangement with respect to the table for allocating transport blocks and/or number of allocated time-domain resources defined for the QPSK based communication, and the TBS and/or the number of allocated time-domain resources are determined using the TBS index and the time-domain resource index that is corresponding to a reduced number of allocated time-domain resources compared to a number of allocated time-domain resources corresponding to the same TBS as required in the table for allocating transport blocks and/or number of allocated time-domain resources defined for the QPSK based communication.

In an exemplary embodiment, the method further includes: receiving, from the network node, an indication to use 16-QAM.

In an exemplary embodiment, the table for allocating transport blocks and/or number of allocated time-domain resources for the 16-QAM based communication corresponds to the TDRA rearrangement and the transport block redistribution with respect to the table for allocating transport blocks and/or number of allocated time-domain resources defined for the QPSK based communication, and the TBS and/or the number of allocated time-domain resources are determined using the TBS index and the time-domain resource index that are respectively different from those indicating the same TBS as required in the table for allocating transport blocks and/or number of allocated time-domain resources defined for the QPSK based communication, wherein the time-domain resource index corresponds to a reduced number of allocated time-domain resources compared to a number of allocated time-domain resources corresponding to the same TBS as required in the table and/or number of allocated time-domain resources for allocating transport blocks defined for the QPSK based communication.

In an exemplary embodiment, the time-domain resource index corresponds to the reduced number of allocated time-domain resources by half compared to the number of allocated time-domain resources corresponding to the same TBS as required in the table for allocating transport blocks and/or number of allocated time-domain resources defined for the QPSK based communication.

In an exemplary embodiment, the transport block redistribution with respect to the table for allocating transport blocks and/or number of allocated time-domain resources defined for the QPSK based communication comprises:

one or more TBSs corresponding to a first subset of the TBS indices in the table for allocating transport blocks and/or number of allocated time-domain resources defined for the QPSK based communication being reused for the 16-QAM based communication but each being indicated by a TBS index and/or a resource index that are respectively different from those time-domain indicating the same TBS as required in the table for allocating transport blocks and/or number of allocated time-domain resources defined for the QPSK based communication; and optionally one or more TBSs in the table for allocating transport blocks and/or number of allocated time-domain resources defined for the QPSK based communication being skipped for the 16-QAM based communication, the one or more skipped TBSs corresponding to a second subset of TBS indices in the table for allocating transport blocks and/or number of allocated time-domain resources defined for the QPSK based communication; and optionally one or more TBSs corresponding to a third subset of the TBS indices in the table for allocating transport blocks and/or number of allocated time-domain resources defined for the QPSK based communication being used for the QPSK based communication.

In an exemplary embodiment, the table for allocating transport blocks and/or number of allocated time-domain resources for the 16-QAM based communication corresponds to the transport block redistribution with respect to the table for allocating transport blocks and/or number of allocated time-domain resources defined for the QPSK based communication, and the TBS and/or the number of allocated time-domain resources are determined using the TBS index and the time-domain resource index that are respectively different from those indicating the same TBS as required in the table for allocating transport blocks and/or number of allocated time-domain resources defined for the QPSK based communication.

In an exemplary embodiment, the transport block redistribution with respect to the table for allocating transport blocks and/or number of allocated time-domain resources defined for the QPSK based communication comprises:

one or more TBSs corresponding to a first subset of the TBS indices in the table for allocating transport blocks and/or number of allocated time-domain resources defined for the QPSK based communication being reused for the 16-QAM based communication but each being indicated by a TBS index and/or a time-domain resource index that are respectively different from those indicating the same TBS as required in the table for allocating transport blocks and/or number of allocated time-domain resources defined for the QPSK based communication; and optionally one or more TBSs in the table for allocating transport blocks and/or number of allocated time-domain resources defined for the QPSK based communication being skipped for the 16-QAM based communication, the one or more skipped TBSs corresponding to a second subset of TBS indices in the table for allocating transport blocks and/or number of allocated time-domain resources defined for the QPSK based communication; and optionally one or more TBSs corresponding to a third subset of the TBS indices in the table for allocating transport blocks and/or number of allocated time-domain resources defined for the QPSK based communication being used for the QPSK based communication.

In an exemplary embodiment, in a case where the 16-QAM based communication is used for uplink, the time-domain resource index corresponds to the number of allocated time-domain resource units.

In an exemplary embodiment, the method further includes: switching to a 16-QAM based uplink communication from a QPSK based uplink communication according to the obtained resource allocation, in which the same TBS as that defined for the QPSK based uplink communication is allocated for the 16-QAM based uplink communication along with a reduced number of allocated time-domain resource units corresponding to the same TBS as required for allocating transport blocks and/or number of allocated time-domain resource units defined for the QPSK based uplink communication to reduce SNR variation between the QPSK based uplink communication and the 16-QAM based uplink communication.

In an exemplary embodiment, the method further includes: transmitting a 16-QAM based uplink transmission to the network node, using a reduced number of allocated time-domain resource units compared to a number of allocated time-domain resource units corresponding to the same TBS as required for allocating transport blocks and/or number of allocated time-domain resource units defined for a QPSK based uplink communication.

In an exemplary embodiment, the method further includes: performing power boosting by adding a power delta in calculation of a transmit power of the wireless device to reduce a gap in terms of a required SNR between the QPSK based uplink communication and the 16-QAM based uplink communication.

In an exemplary embodiment, in a case where the 16-QAM based communication is used for downlink, the time-domain resource index corresponds to the number of allocated subframes.

In an exemplary embodiment, the method further includes: switching to a 16-QAM based downlink communication from a QPSK based downlink communication according to the obtained resource allocation, in which the same TBS as that defined for the QPSK based downlink communication is allocated for the 16-QAM based downlink communication along with a reduced number of allocated subframes corresponding to the same TBS as required for allocating transport blocks and/or number of allocated subframes defined for the QPSK based downlink communication to reduce SNR variation between the QPSK based downlink communication and the 16-QAM based downlink communication.

In an exemplary embodiment, the method further includes: receiving a 16-QAM based downlink transmission from the network node, using a reduced number of allocated subframes compared to a number of allocated subframes corresponding to the same TBS as required for allocating transport blocks and/or number of allocated subframes defined for a QPSK based downlink communication.

According to a third aspect of the present disclosure, a network node is provided. The network node includes: at least one processor, and at least one memory, storing instructions which, when executed on the at least one processor, cause the network node to perform any of the methods according to the first aspect of the present disclosure.

According to a fourth aspect of the present disclosure, a wireless device is provided. The wireless device includes: at least one processor, and at least one memory, storing instructions which, when executed on the at least one processor, cause the wireless device to perform any of the methods according to the second aspect of the present disclosure.

According to a fifth aspect of the present disclosure, a computer readable storage medium is provided. The computer readable storage medium has computer program instructions stored thereon, the computer program instructions, when executed by at least one processor, causing the at least one processor to perform the method according to any of the first and second aspects of the present disclosure.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

FIG. 9 is a diagram of a side-by-side comparison of Alt-1 and Alt-2 for TBS=10 according to some embodiments of the present disclosure;

FIG. 10 is a diagram of a side-by-side comparison of Alt-1 and Alt-2 for TBS=11 according to some embodiments of the present disclosure;

DETAILED DESCRIPTION

Figure 1:
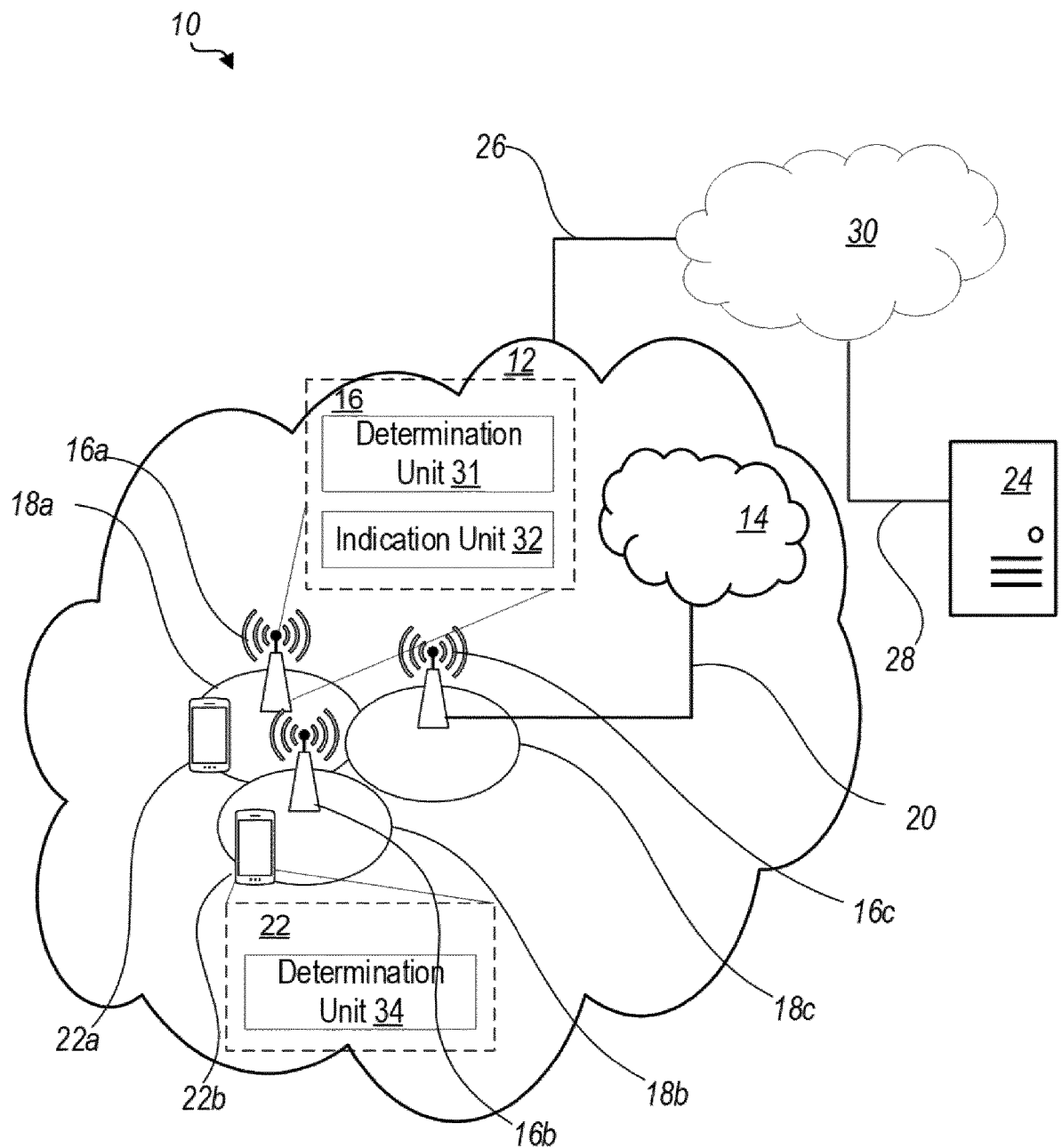
FIG. 1 is a schematic diagram of an exemplary network architecture illustrating a communication system connected via an intermediate network to a host computer according to the principles in the present disclosure.

As describe above, one of the objectives of the WI on "Rel-17 enhancements for NB-IoT and LTE-MTC" is to "Specify 16-QAM for unicast in UL and DL"; however, at least some of the problems directed to its support in NB-IoT are noted below:

Whereas the frequency resource allocation used for QPSK in NB-IoT (i.e., multi-tone and single-tone allocations) is foreseen to be fully or partially re-used for 16-QAM, the resource allocation in the time domain might not remain the same as to observe more gains from the introduction of 16-QAM.

The WID states that "For DL, increase in maximum TBS of e.g. 2× the Rel-16 maximum", but this implies that new Transport Block Size (TBS) entries would have to be added with respect to the available ones for a Cat-NB2 device. However, it is not described how and which of those existing TBS entries will be used with 16-QAM in DL.

The WID states "For UL, the maximum TBS is not increased", this implies that 16-QAM would have to be made available on existing TBS entries of a Cat-NB2 device. However, it is currently not described how and which of those existing TBS entries will be used with 16-QAM in UL.

Before describing in detail exemplary embodiments, it is noted that the embodiments reside primarily in combinations of apparatus components and processing steps related to supporting/implementing 16-quadrature amplitude modulation (16-QAM) based communication based on at least one of: time-domain resource assignment rearrangement, and transport block redistribution.

Accordingly, components have been represented where appropriate by conventional symbols in the drawings, showing only those specific details that are pertinent to understanding the embodiments so as not to obscure the present disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device such as a wireless device or a radio network node.

In some embodiments, the non-limiting terms wireless device or a user equipment (UE) are used interchangeably. The wireless device herein can be any type of wireless device capable of communicating with a network node or another wireless device over radio signals, such as wireless device. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP Long-Term Evolution (LTE) and/or New Radio (NR), may be used in this disclosure, this should not be seen as limiting the scope of the present disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide support for and implementation of 16-quadrature amplitude modulation (16-QAM) based communication based on, for example, at least one of: time-domain resource assignment rearrangement, and transport block redistribution.

One or more embodiment of the present disclosure describes the following solutions/methods, processes/actions to the possible problems for supporting 16-QAM for unicast in UL and DL e.g. for NB-IoT:
Time-Domain Resource Assignment rearrangement:
16-QAM for unicast in UL: When 16-QAM is used, the number of allocated Resource Units is reduced by, e.g., half with respect to the ones allocated when QPSK is used.

To reduce the gap in terms of required SNR between QPSK and 16-QAM, a new component, e.g., a power delta can be added to wireless device's transmit power control equation in NB-IoT as to boost the power by X dB when 16-QAM is used.
16-QAM for unicast in DL: When 16-QAM is used, the number of allocated subframes for NPDSCH is reduced by, e.g., half with respect to the ones allocated when QPSK is used.

Transport Block redistribution:
16-QAM for unicast in UL: When 16-QAM is used, TBS entries selected by ($I_{TBS}$, $I_{RU}$) do not have the same location (i.e., ($I_{TBS}$, $I_{RU}$) position) as in the TBS Table used for QPSK whereas some other ones may be skipped.
16-QAM for unicast in DL: When 16-QAM is used, TBS entries selected by ($I_{TBS}$, $I_{SF}$) do not have the same location (i.e., ($I_{TBS}$, $I_{SF}$) position) as in the TBS Table used for QPSK whereas some other ones may be skipped.

Time-Domain Resource Assignment rearrangement together with Transport Block redistribution.
16-QAM for unicast in UL: When 16-QAM is used, the number of allocated Resource Units is reduced (by, e.g., half), and the TBS entries selected by ($I_{TBS}$, $I_{RU}$) do not have the same location (i.e., ($I_{TBS}$, $I_{RU}$) position) as in the TBS Table used for QPSK.
16-QAM for unicast in DL: When 16-QAM is used the number of allocated subframes for NPDSCH is reduced (by e.g., half), and the TBS entries selected by ($I_{TBS}$, $I_{RU}$) do not have the same location (i.e., ($I_{TBS}$, $I_{RU}$) position) as in the TBS Table used for QPSK The one or more advantages related to one or more embodiments described herein may include the following:
Time-Domain Resource Assignment rearrangement:
The resources in the time-domain may be freed-up earlier when 16-QAM is used as compared to the case when QPSK is used.
One or more embodiments described herein may be directly applied to the legacy TBS table used by QPSK, e.g., by reducing by half, the number of allocated resource units when 16-QAM is used. This may reduce the utilization of resources in the time-domain by half.
Performing a Time-domain resource assignment rearrangement (e.g., by reducing by half the number of allocated resource units when 16-QAM is used) may not require changes on the allocation of resources in the frequency-domain.
When switching from 16-QAM to QPSK and vice versa, all the legacy TBS entries for QPSK may be fully available since the solutions under "Time-Domain Resource Assignment rearrangement" do not require modification of the legacy TBS table for QPSK.

Transport Block redistribution:
One or more embodiments described herein allows for the reorganization of existing TBS entries, e.g., as a function of the achievable code rates of both QPSK and 16-QAM, so as to reduce the gap between those two modulation schemes in terms of required signal-to-interference plus noise ratio (SINR). Moreover, suitable link adaptation is achieved on wireless devices undergoing different channel conditions or different SINR scenarios by carefully redistributing the TBS entries so as to keep for example, for neighbor and adjacent rows in TBS table, small differences in terms of achievable codes.

In the UL, a Transport Block redistribution may avoid having to include a new component e.g., a power delta, to wireless device's transmit power control equation in e.g. NB-IoT so as to boost the power to close the gap in terms of SNR requirements between 16-QAM and QPSK.

A Transport Block redistribution can be applied to TBS entries used by QPSK and 16-QAM, and in that case there may not be a need of adding, as part of the Downlink Control Information, 1-bit to indicate for the wireless device to use QPSK or 16-QAM, since as long as the 16-QAM feature is enabled, a single redistributed TBS table may be used by both modulation schemes with some parts of the TBS table only used with QPSK and the rest with 16-QAM. That is, the Indices used to select the TBS entries in the TBS table would be used to select one modulation scheme or the other since it is known in advance which entries are usable with QPSK and which ones with 16-QAM.

Time-Domain Resource Assignment rearrangement together with Transport Block redistribution.

In one or more embodiments, a hybrid scheme allows a reduction in the resource utilization in the time domain when 16-QAM is used, while keeping the gap in terms of SNR requirements between QPSK and 16-QAM within a predefined range or not beyond a couple of dBs, for example.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device 22a located in coverage area 18a is configured to wirelessly connect to, or be paged by, the corresponding network node 16a. A second wireless device 22b in coverage area 18b is wirelessly connectable to the corresponding network node 16b. While a plurality of wireless devices 22a, 22b (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

A network node 16 is configured to include at least a determination unit 31 which is configured to determine a resource allocation for 16-QAM based communication for a wireless device 22, and an indication unit 32 which is configured to indicate, to the wireless device 22, a transport block size, TBS, and/or a number of allocated time-domain resources that are associated with the determined resource allocation using a TBS index and a time-domain resource index, wherein the TBS index and the time-domain resource index are determined in accordance with a table for allocating transport blocks and/or number of allocated time-domain resources for the 16-QAM based communication, wherein the table for allocating transport blocks and/or number of allocated time-domain resources for the 16-QAM based communication corresponds to at least one of: a time-domain resource assignment (TDRA) rearrangement with respect to a table for allocating transport blocks and/or number of allocated time-domain resources defined for a QPSK based communication, and a transport block redistribution with respect to the table for allocating transport blocks and/or number of allocated time-domain resources defined for the QPSK based communication.

Figure 2:
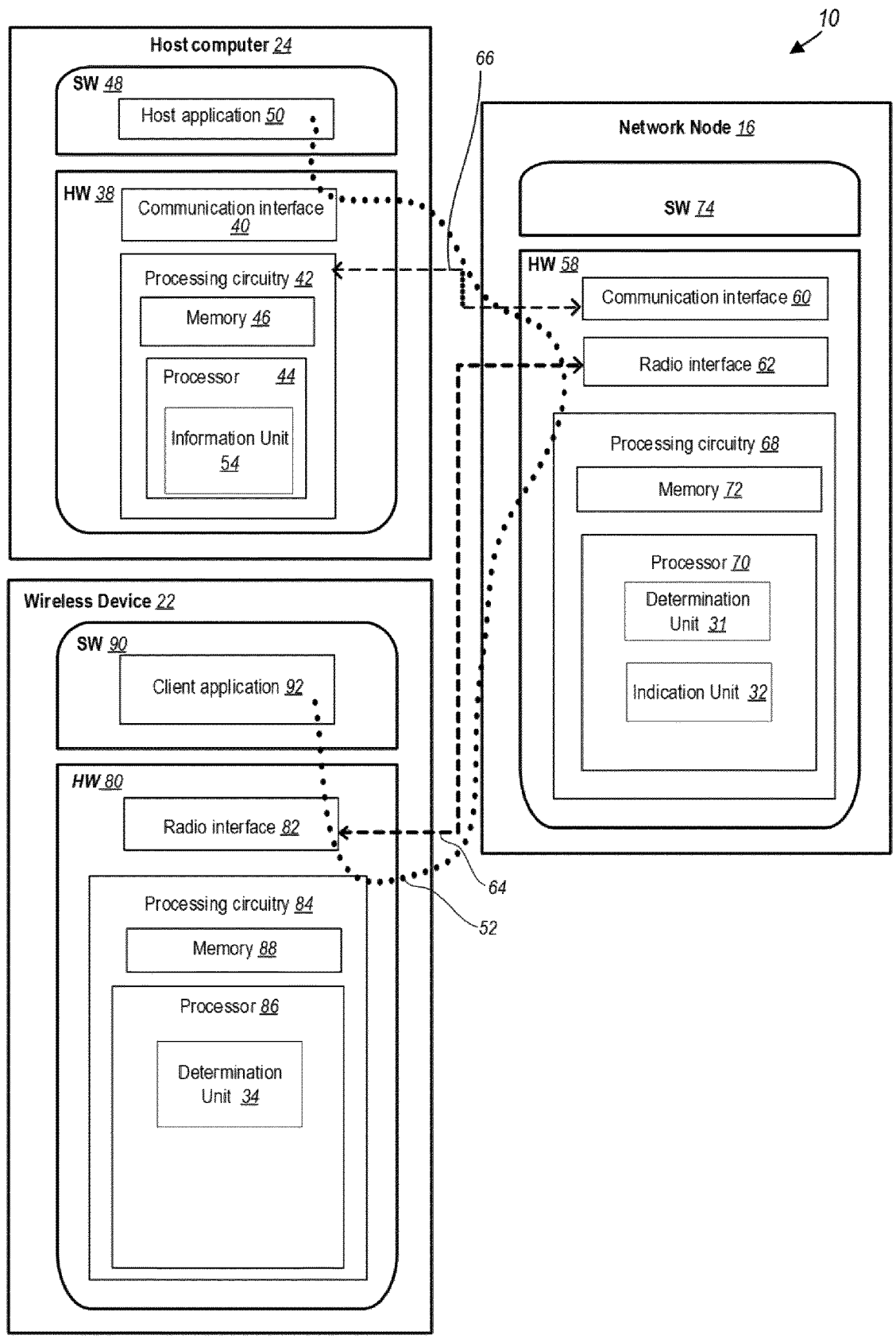
FIG. 2 is a block diagram of a host computer communicating via a network node with a wireless device over an at least partially wireless connection according to some embodiments of the present disclosure.

A wireless device 22 is configured to include at least a determination unit 34 which is configured to determine a TBS and/or a number of allocated time-domain resources using a TBS index and a time-domain resource index received via e.g., a radio interface 82 (as shown in FIG. 2) in accordance with a table for allocating transport blocks and/or number of allocated time-domain resources for 16-QAM based communication to obtain a resource allocation for the 16-QAM based communication for the wireless device, wherein the table for allocating transport blocks and/or number of allocated time-domain resources for the 16-QAM based communication corresponds to at least one of: a TDRA rearrangement with respect to a table for allocating transport blocks and/or number of allocated time-domain resources defined for a quadrature phase shift keying, QPSK, based communication, and a transport block redistribution with respect to the table for allocating transport blocks and/or number of allocated time-domain resources defined for the QPSK based communication.

Example implementations, in accordance with an embodiment, of the wireless device 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to one or more of process, store, determine, forward, relay, transmit, receive, etc., information related to support for and implementation of 16-quadrature amplitude modulation (16-QAM) based communication based on, for example, at least one of: time-domain resource assignment rearrangement, and transport block redistribution.

The communication system 10 further includes a network node 16 provided in a communication system 10 and including hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include at least a determination unit 31 which is configured to determine a resource allocation for 16-QAM based communication for a wireless device 22, and an indication unit 32 which is configured to indicate, to the wireless device 22, a transport block size, TBS, and/or a number of allocated time-domain resources that are associated with the determined resource allocation using a TBS index and a time-domain resource index, wherein the TBS index and the time-domain resource index are determined in accordance with a table for allocating transport blocks and/or number of allocated time-domain resources for the 16-QAM based communication, wherein the table for allocating transport blocks and/or number of allocated time-domain resources for the 16-QAM based communication corresponds to at least one of: a time-domain resource assignment (TDRA) rearrangement with respect to a table for allocating transport blocks and/or number of allocated time-domain resources defined for a QPSK based communication, and a transport block redistribution with respect to the table for allocating transport blocks and/or number of allocated time-domain resources defined for the QPSK based communication.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database, storage array, network storage device, etc.) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include at least a determination unit 34 configured to determine a TBS and/or a number of allocated time-domain resources using a TBS index and a time-domain resource index received via e.g., a radio interface 82 (as shown in FIG. 2) in accordance with a table for allocating transport blocks and/or number of allocated time-domain resources for 16-QAM based communication to obtain a resource allocation for the 16-QAM based communication for the wireless device, wherein the table for allocating transport blocks and/or number of allocated time-domain resources for the 16-QAM based communication corresponds to at least one of: a TDRA rearrangement with respect to a table for allocating transport blocks and/or number of allocated time-domain resources defined for a quadrature phase shift keying, QPSK, based communication, and a transport block redistribution with respect to the table for allocating transport blocks and/or number of allocated time-domain resources defined for the QPSK based communication.

In some embodiments, the inner workings of the network node 16, wireless device 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the wireless device 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the wireless device 22, and/or preparing/terminating/maintaining/supporting/ending in receipt of a transmission from the wireless device 22.

In some embodiments, the host computer 24 includes processing circuitry 42 and a communication interface 40 that is configured to a communication interface 40 configured to receive user data originating from a transmission from a wireless device 22 to a network node 16. In some embodiments, the wireless device 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as determination unit 31 and indication unit 32 of the network node 16, and determination unit 34 of the wireless device 22 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a wireless device 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the wireless device 22 (Block S104). In an optional third step, the network node 16 transmits to the wireless device 22 the user data which was carried in the transmission that the host computer 24 initiated, in accordance with the teachings of the embodiments described throughout this disclosure (Block S106). In an optional fourth step, the wireless device 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the wireless device 22 (Block S112). The transmission may pass via the network node 16, in accordance with the teachings of the embodiments described throughout this disclosure. In an optional third step, the wireless device 22 receives the user data carried in the transmission (Block S114).

Figure 5:
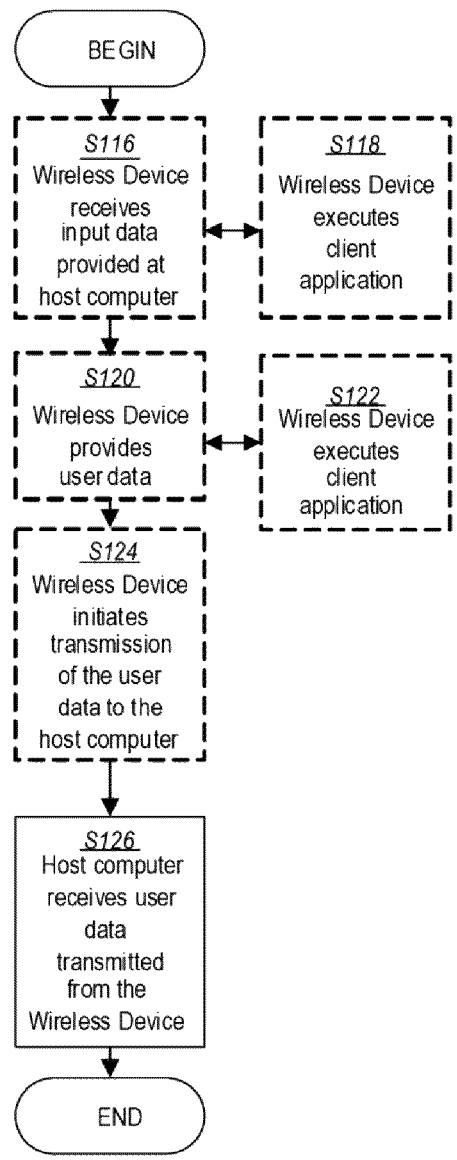
FIG. 5 is a flowchart illustrating exemplary methods implemented in a communication system including a host computer, a network node and a wireless device for receiving user data from the wireless device at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In an optional first step of the method, the wireless device 22 receives input data provided by the host computer 24 (Block S116). In an optional substep of the first step, the wireless device 22 executes the client application 92, which provides the user data in reaction to the received input data provided by the host computer 24 (Block S118). Additionally or alternatively, in an optional second step, the wireless device 22 provides user data (Block S120). In an optional substep of the second step, the wireless device provides the user data by executing a client application, such as, for example, client application 92 (Block S122). In providing the user data, the executed client application 92 may further consider user input received from the user. Regardless of the specific manner in which the user data was provided, the wireless device 22 may initiate, in an optional third substep, transmission of the user data to the host computer 24 (Block S124). In a fourth step of the method, the host computer 24 receives the user data transmitted from the wireless device 22, in accordance with the teachings of the embodiments described throughout this disclosure (Block S126).

Figure 6:
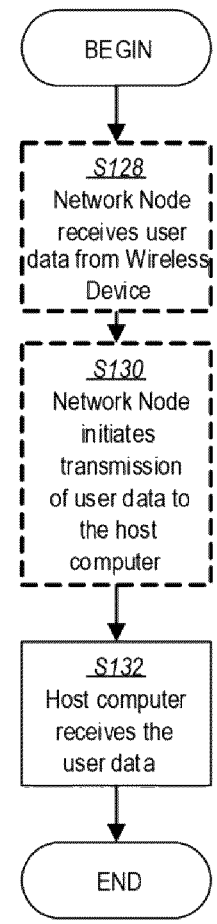
FIG. 6 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In an optional first step of the method, in accordance with the teachings of the embodiments described throughout this disclosure, the network node 16 receives user data from the wireless device 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
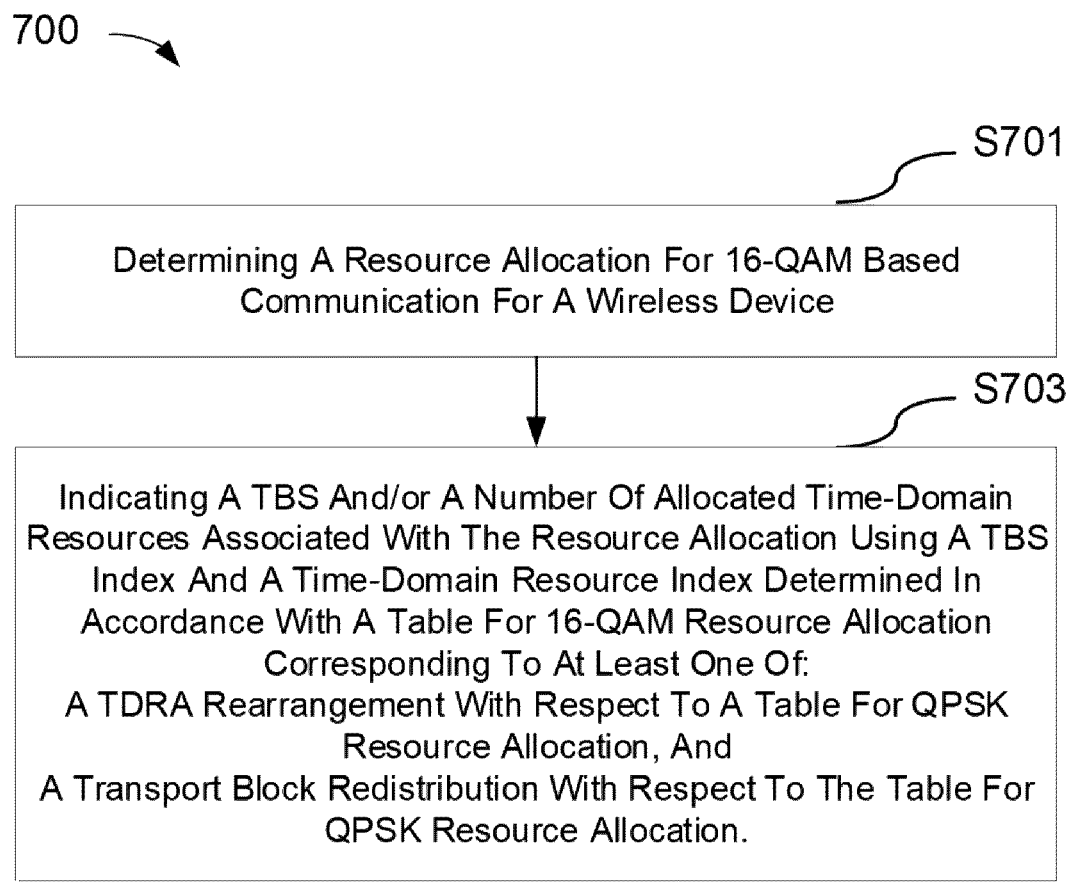
FIG. 7 is a flowchart of an exemplary process in a network node according to some embodiments of the present disclosure.

FIG. 7 is a flowchart of an exemplary process (method 700) in a network node 16 according to some embodiments of the present disclosure.

One or more Blocks and/or functions performed by network node 16 may be performed by one or more elements of network node 16 such as by determination unit 31, indication unit 32 in processing circuitry 68, processor 70, radio interface 62, etc. In one or more embodiments, network node 16 such as via one or more of processing circuitry 68, processor 70, determination unit 31, communication interface 60 and radio interface 62 may be configured to determine (Block S701) a resource allocation for 16-quadrature amplitude modulation (16-QAM) based communication for the wireless device 22. Then, the network node 16 such as via one or more of processing circuitry 68, processor 70, indication unit 32, communication interface 60 and radio interface 62 may be configured to indicate (Block S703), to the wireless device 22, a TBS and/or a number of allocated time-domain resources that are associated with the determined resource allocation using a TBS index and a time-domain resource index, wherein the TBS index and the time-domain resource index are determined in accordance with a table for allocating transport blocks and/or number of allocated time-domain resources for the 16-QAM based communication, wherein the table for allocating transport blocks and/or number of allocated time-domain resources for the 16-QAM based communication corresponds to at least one of: a time-domain resource assignment (TDRA) rearrangement with respect to a table for allocating a transport blocks and/or number of allocated time-domain resources defined for a QPSK based communication and a transport block redistribution with respect to the table for allocating transport blocks and/or number of allocated time-domain resources defined for the QPSK based communication, as described herein.

In an exemplary embodiment, the table for allocating transport blocks and/or number of allocated time-domain resources for the 16-QAM based communication may correspond to the TDRA rearrangement (e.g., Alternative 1, Alternative 2 as will be described in detail later) with respect to the table for allocating transport blocks and/or number of allocated time-domain resources defined for the QPSK based communication (e.g., Table 16.5.1.2-2 as shown previously).

In this case, the TBS may be indicated using the TBS index and the time-domain resource index that is corresponding to a reduced number of allocated time-domain resources e.g., by half, (e.g., as shown in Table 1.1c for Alternative 1, Table 1.2b for Alternative 2 as will be described later) compared to a number of allocated time-domain resources corresponding to the same TBS as required in the table for allocating transport blocks and/or number of allocated time-domain resources defined for the QPSK based communication.

Alternatively or additionally, the network node 16 transmits to the wireless device 22 an indication to use 16-QAM.

In an exemplary embodiment, the table for allocating transport blocks and/or number of allocated time-domain resources for the 16-QAM based communication may correspond to the transport block redistribution (e.g., Alternative 3 as will be described in detail later) with respect to the table for allocating transport blocks and/or number of allocated time-domain resources defined for the QPSK based communication (e.g., Table 16.5.1.2-2 as shown previously).

In this case, the TBS may be indicated using the TBS index and the time-domain resource index that are respectively different (e.g., as shown in Table 2.2a for Alternative 3 as will be described later) from those indicating the same TBS as required in the table for allocating transport blocks and/or number of allocated time-domain resources defined for the QPSK based communication.

The transport block redistribution with respect to the table for allocating transport blocks and/or number of allocated time-domain resources defined for the QPSK based communication may include:

one or more TBSs corresponding to a first subset of the TBS indices (e.g., $I_{TBS}$=3, 5, 9, 12 and 13) in the table (e.g., Table 16.5.1.2-2 as shown previously) for allocating transport blocks and/or number of allocated time-domain resources previously defined for the QPSK based communication being reused for the 16-QAM based communication but each being indicated by a TBS index and/or a time-domain resource index that are respectively different from those indicating the same TBS as required in the table for allocating transport blocks and/or number of allocated time-domain resources previously defined for the QPSK based communication; and optionally one or more TBSs in the table for allocating transport blocks and/or number of allocated time-domain resources previously defined for the QPSK based communication being skipped for the 16-QAM based communication, the one or more skipped TBSs corresponding to a second subset of TBS indices (e.g., $I_{TBS}$=3, 5, 9, 12 and 13) in the table (e.g., Table 16.5.1.2-2 as shown previously) for allocating transport blocks and/or number of allocated time-domain resources previously defined for the QPSK based communication; and optionally one or more TBSs corresponding to a third subset of the TBS indices (e.g., $I_{TBS}$=0, 1, 2, 4, 6, 7, 8, 10 and 11) in the table (e.g., Table 16.5.1.2-2 as shown previously) for allocating transport blocks and/or number of allocated time-domain resources previously defined for the QPSK based communication being used for the QPSK based communication.

In an exemplary embodiment, the table for allocating transport blocks and/or number of allocated time-domain resources for the 16-QAM based communication may correspond to the TDRA rearrangement and the transport block redistribution (e.g., Alternative 4 as will be described in detail later) with respect to the table for allocating transport blocks and/or number of allocated time-domain resources defined for the QPSK based communication (e.g., Table 16.5.1.2-2 as shown previously).

In this case, the TBS may be indicated using the TBS index and the time-domain resource index that are respectively different (e.g., as shown in Table 3.3a for Alternative 4 as will be described in detail later) from those indicating the same TBS as required in the table for allocating transport blocks and/or number of allocated time-domain resources defined for the QPSK based communication, wherein the time-domain resource index corresponds to a reduced number of allocated time-domain resources compared to a number of allocated time-domain resources corresponding to the same TBS as required in the table for allocating transport blocks and/or number of allocated time-domain resources defined for the QPSK based communication.

The transport block redistribution with respect to the table for allocating transport blocks and/or number of allocated time-domain resources defined for the QPSK based communication may include:

one or more TBSs corresponding to a first subset of the TBS indices (e.g., $I_{TBS}$=3, 5, 9, 12 and 13) in the table (e.g., Table 16.5.1.2-2 as shown previously) for allocating transport blocks and/or number of allocated time-domain resources previously defined for the QPSK based communication being reused for the 16-QAM based communication but each being indicated by a TBS index and/or a time-domain resource index that are respectively different from those indicating the same TBS as required in the table for allocating transport blocks and/or number of allocated time-domain resources previously defined for the QPSK based communication; and optionally one or more TBSs in the table (e.g., Table 16.5.1.2-2 as shown previously) for allocating transport blocks and/or number of allocated time-domain resources previously defined for the QPSK based communication being skipped for the 16-QAM based communication, the one or more skipped TBSs corresponding to a second subset of TBS indices (e.g., $I_{TBS}$=3, 5, 9, 12 and 13) in the table (e.g., Table 16.5.1.2-2 as shown previously) for allocating transport blocks and/or number of allocated time-domain resources previously defined for the QPSK based communication; and optionally one or more TBSs corresponding to a third subset of the TBS indices (e.g., $I_{TBS}$=0, 1, 2, 4, 6, 7, 8, 10 and 11) in the table (e.g., Table 16.5.1.2-2 as shown previously) for allocating transport blocks and/or number of allocated time-domain resources previously defined for the QPSK based communication being used for the QPSK based communication.

For uplink (UL), the time-domain resource index corresponds to the number of allocated time-domain resource units.

In an exemplary embodiment, the network node 16 and the wireless device 22 may perform the QPSK based communication previously. The network node 16 may determine the resource allocation for 16-QAM based communication in Block S701, e.g., according to channel condition etc. As previously described in Block S703, the network node 16 may use a TBS index and a time-domain resource index that are determined in accordance with the table for allocating transport blocks and/or number of allocated time-domain resource units for the 16-QAM based communication as previously described to indicate, to the wireless device 22, the corresponding TBS and/or number of allocated time-domain resource units that are associated with the determined resource allocation.

Accordingly, the network node 16 may switch to the 16-QAM based uplink communication from the QPSK based uplink communication according to the determined resource allocation, in which the same TBS as that defined for the QPSK based uplink communication is allocated for the 16-QAM based uplink communication along with a reduced number of allocated time-domain resource units corresponding to the same TBS as required for allocating transport blocks and/or number of allocated time-domain resource units defined for the QPSK based uplink communication to reduce SNR variation between the QPSK based uplink communication and the 16-QAM based uplink communication.

Alternatively or additionally, the network node 16 may receive the 16-QAM based uplink transmission from the wireless device 22, using the reduced number of allocated time-domain resource units compared to the number of allocated time-domain resource units corresponding to the same TBS as required for allocating transport blocks and/or number of allocated time-domain resource units defined for a QPSK based uplink communication to achieve same or similar code rates.

For downlink (DL), the time-domain resource index corresponds to the number of allocated subframes.

Similarly in another exemplary embodiment, the network node 16 and the wireless device 22 may perform the QPSK based communication previously. The network node 16 may determine the resource allocation for 16-QAM based communication in Block S701, e.g., according to channel condition etc. As previously described in Block S703, the network node 16 may use a TBS index and a time-domain resource index that are determined in accordance with the table for allocating transport blocks and/or number of allocated subframes for the 16-QAM based communication as previously described to indicate, to the wireless device 22, the corresponding TBS and/or number of allocated subframes that are associated with the determined resource allocation.

Accordingly, the network node 16 may switch to the 16-QAM based downlink communication from a QPSK based downlink communication according to the determined resource allocation, in which the same TBS as that defined for the QPSK based downlink communication is allocated for the 16-QAM based downlink communication along with a reduced number of allocated subframes corresponding to the same TBS as required for allocating transport blocks and/or number of allocated subframes defined for the QPSK based downlink communication to reduce SNR variation between the QPSK based downlink communication and the 16-QAM based downlink communication.

Alternatively or additionally, the network node 16 may transmit the 16-QAM based downlink transmission to the wireless device, using a reduced number of allocated subframes compared to a number of allocated subframes corresponding to the same TBS as required for allocating transport blocks and/or number of allocated subframes defined for a QPSK based downlink communication.

Figure 8:
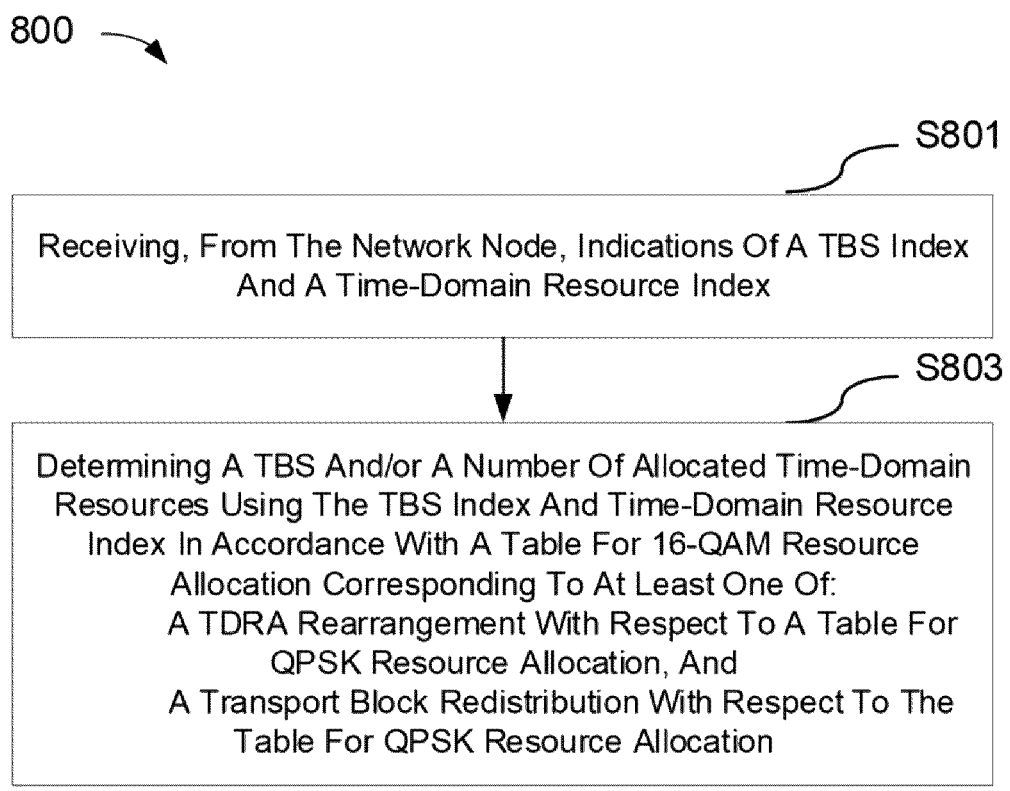
FIG. 8 is a flowchart of an exemplary process in a wireless device according to some embodiments of the present disclosure.
Figure 11:
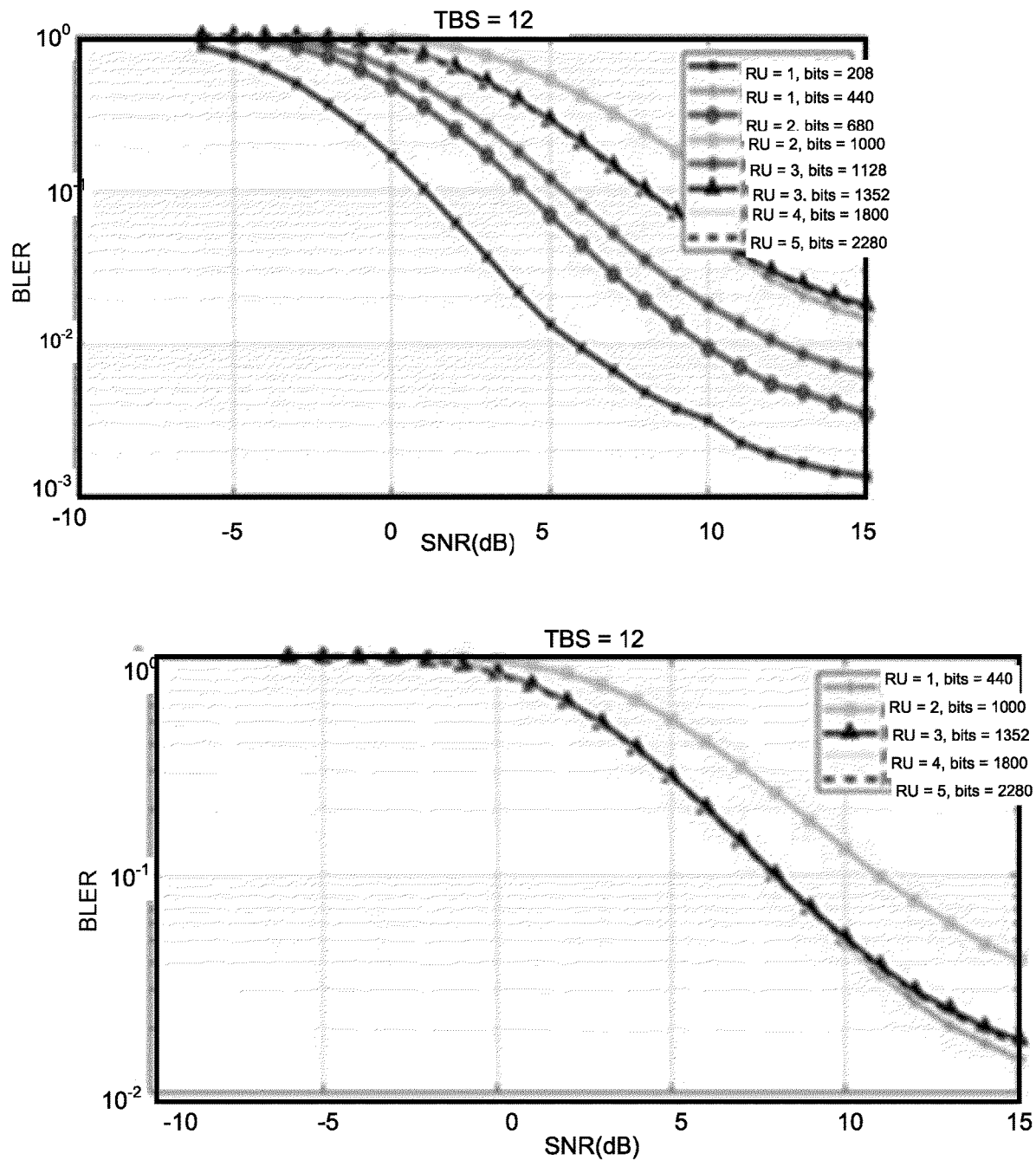
FIG. 11 is a diagram of a side-by-side comparison of Alt-1 and Alt-2 for TBS=12 according to some embodiments of the present disclosure.
Figure 12:
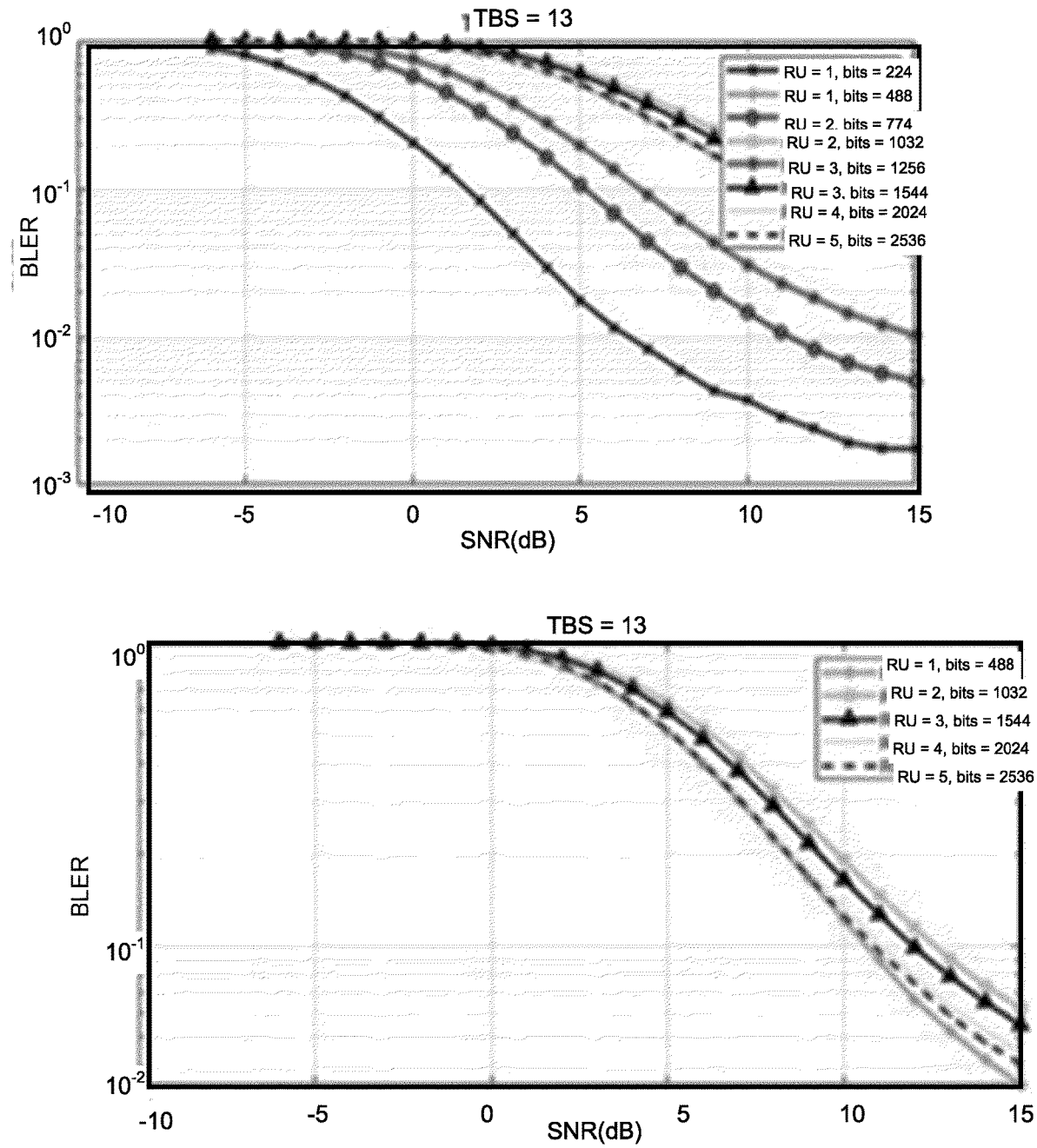
FIG. 12 is a diagram of a side-by-side comparison of Alt-1 and Alt-2 for TBS=13 according to some embodiments of the present disclosure.

FIG. 8 is a flowchart of an exemplary process (method 800) in a wireless device 22 according to some embodiments of the present disclosure.

One or more Blocks and/or functions performed by wireless device 22 may be performed by one or more elements of wireless device 22 such as by determination unit 34 in processing circuitry 84, processor 86, radio interface 82, etc. In one or more embodiments, the wireless device 22 such as via radio interface 82 is configured to receive (Block S801), from the network node 16, indications of a TBS index and a time-domain resource index. Then, the wireless device 22 such as via one or more of processing circuitry 84, processor 86, determination unit 34, radio interface 82 is configured to determine (Block S803) a TBS and/or a number of allocated time-domain resources using the received TBS index and time-domain resource index in accordance with a table for allocating transport blocks and/or number of allocated time-domain resources for 16-QAM based communication to obtain a resource allocation for the 16-QAM based communication for the wireless device, wherein the table for allocating transport blocks and/or number of allocated time-domain resources for the 16-QAM based communication corresponds to at least one of: a TDRA rearrangement with respect to a table for allocating transport blocks and/or number of allocated time-domain resources defined for a QPSK based communication, and a transport block redistribution with respect to the table for allocating transport blocks and/or number of allocated time-domain resources defined for the QPSK based communication, as described herein.

In an exemplary embodiment, the table for allocating transport blocks and/or number of allocated time-domain resources for the 16-QAM based communication may correspond to the TDRA rearrangement (e.g., Alternative 1, Alternative 2 as will be described in detail later) with respect to the table for allocating transport blocks and/or number of allocated time-domain resources defined for the QPSK based communication (e.g., Table 16.5.1.2-2 as shown previously).

In this case, the TBS may be indicated using the TBS index and the time-domain resource index that is corresponding to a reduced number of allocated time-domain resources e.g., by half, (e.g., as shown in Table 1.1c for Alternative 1, Table 1.2b for Alternative 2 as will be described later) compared to a number of allocated time-domain resources corresponding to the same TBS as required in the table for allocating transport blocks and/or number of allocated time-domain resources defined for the QPSK based communication.

Alternatively or additionally, the wireless device 22 may receive, from the network node 16, an indication to use 16-QAM.

In an exemplary embodiment, the table for allocating transport blocks and/or number of allocated time-domain resources for the 16-QAM based communication may correspond to the transport block redistribution (e.g., Alternative 3 as will be described in detail later) with respect to the table for allocating transport blocks and/or number of allocated time-domain resources defined for the QPSK based communication (e.g., Table 16.5.1.2-2 as shown previously).

In this case, the TBS may be indicated using the TBS index and the time-domain resource index that are respectively different (e.g., as shown in Table 2.2a for Alternative 3 as will be described later) from those indicating the same TBS as required in the table for allocating transport blocks and/or number of allocated time-domain resources defined for the QPSK based communication.

The transport block redistribution with respect to the table for allocating transport blocks and/or number of allocated time-domain resources defined for the QPSK based communication may include:

one or more TBSs corresponding to a first subset of the TBS indices (e.g., $I_{TBS}$=3, 5, 9, 12 and 13) in the table (e.g., Table 16.5.1.2-2 as shown previously) for allocating transport blocks and/or number of allocated time-domain resources previously defined for the QPSK based communication being reused for the 16-QAM based communication but each being indicated by a TBS index and/or a time-domain resource index that are respectively different from those indicating the same TBS as required in the table for allocating transport blocks and/or number of allocated time-domain resources previously defined for the QPSK based communication; and optionally one or more TBSs in the table for allocating transport blocks and/or number of allocated time-domain resources previously defined for the QPSK based communication being skipped for the 16-QAM based communication, the one or more skipped TBSs corresponding to a second subset of TBS indices (e.g., $I_{TBS}$=3, 5, 9, 12 and 13) in the table (e.g., Table 16.5.1.2-2 as shown previously) for allocating transport blocks and/or number of allocated time-domain resources previously defined for the QPSK based communication; and optionally one or more TBSs corresponding to a third subset of the TBS indices (e.g., $I_{TBS}$=0, 1, 2, 4, 6, 7, 8, 10 and 11) in the table (e.g., Table 16.5.1.2-2 as shown previously) for allocating transport blocks and/or number of allocated time-domain resources previously defined for the QPSK based communication being used for the QPSK based communication.

In an exemplary embodiment, the table for allocating transport blocks and/or number of allocated time-domain resources for the 16-QAM based communication may correspond to the TDRA rearrangement and the transport block redistribution (e.g., Alternative 4 as will be described in detail later) with respect to the table for allocating transport blocks and/or number of allocated time-domain resources defined for the QPSK based communication (e.g., Table 16.5.1.2-2 as shown previously).

In this case, the TBS may be indicated using the TBS index and the time-domain resource index that are respectively different (e.g., as shown in Table 3.3a for Alternative 4 as will be described in detail later) from those indicating the same TBS as required in the table for allocating transport blocks and/or number of allocated time-domain resources defined for the QPSK based communication, wherein the time-domain resource index corresponds to a reduced number of allocated time-domain resources compared to a number of allocated time-domain resources corresponding to the same TBS as required in the table for allocating transport blocks and/or number of allocated time-domain resources defined for the QPSK based communication.

The transport block redistribution with respect to the table for allocating transport blocks and/or number of allocated time-domain resources defined for the QPSK based communication may include:

one or more TBSs corresponding to a first subset of the TBS indices (e.g., $I_{TBS}$=3, 5, 9, 12 and 13) in the table (e.g., Table 16.5.1.2-2 as shown previously) for allocating transport blocks and/or number of allocated time-domain resources previously defined for the QPSK based communication being reused for the 16-QAM based communication but each being indicated by a TBS index and/or a time-domain resource index that are respectively different from those indicating the same TBS as required in the table for allocating transport blocks and/or number of allocated time-domain resources previously defined for the QPSK based communication; and optionally one or more TBSs in the table for allocating transport blocks and/or number of allocated time-domain resources previously defined for the QPSK based communication being skipped for the 16-QAM based communication, the one or more skipped TBSs corresponding to a second subset of TBS indices (e.g., $I_{TBS}$=3, 5, 9, 12 and 13) in the table (e.g., Table 16.5.1.2-2 as shown previously) for allocating transport blocks and/or number of allocated time-domain resources previously defined for the QPSK based communication being skipped; and optionally one or more TBSs corresponding to a third subset of the TBS indices (e.g., $I_{TBS}$=0, 1, 2, 4, 6, 7, 8, 10 and 11) in the table (e.g., Table 16.5.1.2-2 as shown previously) for allocating transport blocks and/or number of allocated time-domain resources previously defined for the QPSK based communication being used for the QPSK based communication.

For uplink (UL), the time-domain resource index corresponds to the number of allocated time-domain resource units.

In an exemplary embodiment, the wireless device 22 may perform power boosting by adding a power delta (e.g., $\Delta T_{F,c}(i)$ as will be described in detail later) in calculation of a transmit power of the wireless device to reduce a gap in terms of a required SNR, i.e., SNR variation, between the QPSK based uplink communication and the 16-QAM based uplink communication.

In an exemplary embodiment, the network node 16 and the wireless device 22 may perform the QPSK based uplink communication previously. As previously described, the network node 16 may determine the resource allocation for 16-QAM based uplink communication, e.g., according to channel condition etc., and indicate, to the wireless device 22, the corresponding TBS, and/or number of allocated time-domain resources that are associated with the determined resource allocation using a TBS index and a time-domain resource index. Accordingly, the wireless device 22, after receiving (Block S801) the indications of the TBS index and the time-domain resource index from the network node 16, may determine (Block S803) the corresponding TBS and/or number of allocated time-domain resources using the received TBS index and time-domain resource index in accordance with the table for allocating transport blocks and/or number of allocated time-domain resource units for 16-QAM based uplink communication as previously described to obtain the resource allocation for the 16-QAM based uplink communication configured by the network node 16 for the wireless device 22.

Accordingly, the wireless device 22 may switch to the 16-QAM based uplink communication from the QPSK based uplink communication according to the obtained resource allocation, in which the same TBS as that defined for the QPSK based uplink communication is allocated for the 16-QAM based uplink communication along with a reduced number of allocated time-domain resource units corresponding to the same TBS as required for allocating transport blocks and/or number of allocated time-domain resource units defined for the QPSK based uplink communication to reduce SNR variation between the QPSK based uplink communication and the 16-QAM based uplink communication.

Alternatively or additionally, the wireless device 22 may transmit the 16-QAM based uplink transmission to the network node 16, using the reduced number of allocated time-domain resource units compared to the number of allocated time-domain resource units corresponding to the same TBS as required for allocating transport blocks and/or number of allocated time-domain resource units defined for the QPSK based uplink communication to achieve same or similar code rates.

For downlink (DL), the time-domain resource index corresponds to the number of allocated subframes.

Similarly in another exemplary embodiment, the network node 16 and the wireless device 22 may perform the QPSK based communication previously. As previously described, the wireless device 22, after receiving (Block S801) the indications of the TBS index and the time-domain resource index from the network node 16, may determine (Block S803) the corresponding TBS and/or number of allocated subframes using the received TBS index and time-domain resource index in accordance with the table for allocating transport blocks and/or number of allocated subframes for 16-QAM based uplink communication as previously described to obtain the resource allocation for the 16-QAM based uplink communication configured by the network node 16 for the wireless device 22.

Accordingly, the wireless device 22 may switch to the 16-QAM based downlink communication from the QPSK based downlink communication according to the obtained resource allocation, in which the same TBS as that defined for the QPSK based downlink communication is allocated for the 16-QAM based downlink communication along with a reduced number of allocated subframes corresponding to the same TBS as required for allocating transport blocks and/or number of allocated subframes defined for the QPSK based downlink communication to reduce SNR variation between the QPSK based downlink communication and the 16-QAM based downlink communication.

Alternatively or additionally, the wireless device 22 may receive the 16-QAM based downlink transmission from the network node 16, using the reduced number of allocated subframes compared to a number of allocated subframes corresponding to the same TBS as required for allocating transport blocks and/or number of allocated subframes defined for the QPSK based downlink communication.

Having generally described arrangements for support for and implementation of 16-quadrature amplitude modulation (16-QAM) based communication based on, for example, at least one of: time-domain resource assignment rearrangement, and transport block redistribution, details for these arrangements, functions and processes are provided as follows, and which may be implemented by the network node 16, wireless device 22 and/or host computer 24.

Embodiments provide support for and implementation of 16-quadrature amplitude modulation (16-QAM) based commmunication based on, for example, at least one of: time-domain resource assignment rearrangement, and transport block redistribution. In the subsections below from "Time-Domain Resource Assignment rearrangement" subsection to the "Time-Domain Resource Assignment Rearrangement Together With Transport Block Redistribution" subsection, there are described one or more embodiments focusing in the uplink (UL), whereas in the "Time-Domain Resource Assignment Rearrangement and Transport Blocks Redistribution To Introduce 16-QAM in DL" subsection, there is described one or more embodiments that may be for the downlink (DL) such as the DL in e.g. NB-IoT.

Time-Domain Resource Assignment Rearrangement

The 16-QAM modulation scheme doubles the number of bits per M-ary symbol with respect to QPSK. Therefore, when 16-QAM's modulation scheme is implemented by the wireless device 22 and/or network node 16, it may be possible to reduce by half of the time-domain resource utilization as compared to the time-domain resources used when the QPSK modulation scheme is utilized.

Alternative 1

When the number of UL allocated subcarriers is different than one, $I_{TBS}=I_{MCS}$ whereas the index $I_{RU}$ is mapped to a number of allocated Resource Units (RUs) according with Table 16.5.1.1-2 in 3GPP TS 36.213 v.16.0.0. That is, $I_{MCS}$ goes in ascending order from 0 to 13 in steps of 1, whereas the number of RUs is as follows:

TABLE 1.1a

Number of RUs for QPSK in UL
Number of RUs

| 1 | 2 | 3 | 4 | 5 | 6 | 8 | 10 |
|---|---|---|---|---|---|---|----|

In Alternative 1, the $I_{MCS}$ ranges from 10 to 13 in steps of 1, whereas for the "Number of RUs", the following principles are applied with respect to Table 1a:

The number of RUs is determined by Ceil(Num_of_RUs/2) as to produce the following table:

TABLE 1.1b

Re-arrangement of the Number of RUs
according to Alt-1 for 16-QAM in UL
Number of RUs

| 1 | 1 | 2 | 2 | 3 | 3 | 4 | 5 |
|---|---|---|---|---|---|---|---|

The above rearrangement may reduce the utilization of resources in the time-domain, while keeping for 16-QAM the achievable code rates no higher than the ones offered by QPSK. Table 1.1c illustrates the TBS table to be used for 16-QAM in UL according to Alternative 1 (Alt-1), whereas Table 1d compares the achievable code rates respectively achieved by QPSK and 16-QAM on the same Transport Blocks.

TABLE 1.1c

TBS Table for 16-QAM in UL according to Alternative 1

| $I_{TBS}$ | $N_{RU}$ | | | | | | | |
|---|---|---|---|---|---|---|---|---|
| | 1 | 1 | 2 | 2 | 3 | 3 | 4 | 5 |
| 10 | 144 | 328 | 504 | 680 | 872 | 1000 | 1384 | 1736 |
| 11 | 176 | 376 | 584 | 776 | 1000 | 1192 | 1608 | 2024 |
| 12 | 208 | 440 | 680 | 1000 | 1128 | 1352 | 1800 | 2280 |
| 13 | 224 | 488 | 744 | 1032 | 1256 | 1544 | 2024 | 2536 |

TABLE 1.1d

Achievable Code Rates by A) QPSK, B) 16-QAM in UL according to Alternative 1

A) Achievable Code Rates by QPSK

| $I_{TBS}$ | Number of RUs | | | | | | | |
|---|---|---|---|---|---|---|---|---|
| | 1 | 2 | 3 | 4 | 5 | 6 | 8 | 10 |
| 10 | 0.58 | 0.61 | 0.61 | 0.61 | 0.62 | 0.59 | 0.61 | 0.61 |
| 11 | 0.69 | 0.69 | 0.7 | 0.69 | 0.71 | 0.7 | 0.71 | 0.71 |
| 12 | 0.81 | 0.81 | 0.81 | 0.89 | 0.8 | 0.8 | 0.79 | 0.8 |
| 13 | 0.86 | 0.89 | 0.89 | 0.92 | 0.89 | 0.91 | 0.89 | 0.89 |

B) Achievable Code Rates by 16-QAM in UL according to Alterative 1

| $I_{TBS}$ | Number of RUs | | | | | | | |
|---|---|---|---|---|---|---|---|---|
| | 1 | 1 | 2 | 2 | 3 | 3 | 4 | 5 |
| 10 | 0.29 | 0.61 | 0.46 | 0.61 | 0.52 | 0.59 | 0.61 | 0.61 |
| 11 | 0.35 | 0.69 | 0.53 | 0.69 | 0.59 | 0.7 | 0.71 | 0.71 |
| 12 | 0.4 | 0.81 | 0.61 | 0.89 | 0.67 | 0.8 | 0.79 | 0.8 |
| 13 | 0.43 | 0.89 | 0.67 | 0.92 | 0.74 | 0.91 | 0.89 | 0.89 |

If Alternative 1 were implemented to introduce 16-QAM in UL for NB-IoT, then there may need to be an indication to the wireless device 22 (e.g., through 1-bit in DCI) such as via one or more of processing circuitry 68, processor 70, radio interface 62, indication unit 32, etc., on whether the wireless device 22 has been instructed to use QPSK or 16-QAM, i.e., the wireless device 22 may receive an indication such as via one or more of processing circuitry 84, processor 86, radio interface 82, determination unit 34, etc. This means that when the network node 16 such as via one or more of processing circuitry 68, processor 70, radio interface 62, indication unit 32, etc., has instructed the wireless device 22 to use QPSK, the legacy TBS table would be fully available and used such as via one or more of processing circuitry 84, processor 86, radio interface 82, determination unit 34, etc., as performed in existing systems ($I_{MCS}$ from 0 to 13 in steps of 1 together with RUs as per Table 1.1a), whereas when 16-QAM is used, only $I_{MCS}$ from 10 to 13 in steps of 1 would be used along with the RU re-arrangement as illustrated in Table 1.1b.

Alternative 2

In Alternative 2, the $I_{MCS}$ ranges from 10 to 13 in steps of 1, whereas for the "Number of RUs", the following principles are applied with respect to Table 1.1a:
The first, third and fifth columns are unused, for the rest the number of RUs is determined by Num_of_RUs/2 as to produce the following:

TABLE 1.2a

Re-arrangement of the Number of RUs
according to Alternative 2 for 16-QAM in UL
Number of RUs

| N/A | 1 | N/A | 2 | N/A | 3 | 4 | 5 |
|---|---|---|---|---|---|---|---|

Alternative 2 also reduces (e.g., significantly reduces) the utilization of resources in the time-domain, keeping for 16-QAM, the achievable code rates the same as the ones offered by QPSK. Table 1.2b illustrates the TBS table to be used for 16-QAM in UL according to Alternative 2, whereas Table 1.2c compares the achievable code rates respectively achieved by QPSK and 16-QAM on the same Transport Blocks.

TABLE 1.2b

TBS Table for 16-QAM in UL according to Alternative 2

| $I_{TBS}$ | $N_{RU}$ | | | | | | | |
|---|---|---|---|---|---|---|---|---|
| | NA | 1 | NA | 2 | NA | 3 | 4 | 5 |
| 10 | — | 328 | — | 680 | — | 1000 | 1384 | 1736 |
| 11 | — | 376 | — | 776 | — | 1192 | 1608 | 2024 |
| 12 | — | 440 | — | 1000 | — | 1352 | 1800 | 2280 |
| 13 | — | 488 | — | 1032 | — | 1544 | 2024 | 2536 |

TABLE 1.2c

Achievable Code Rates by A) QPSK, B) 16-QAM in UL according to Alt-2

A) Achievable Code Rates by QPSK

| $I_{TBS}$ | Number of RUs | | | | | | | |
|---|---|---|---|---|---|---|---|---|
| | 1 | 2 | 3 | 4 | 5 | 6 | 8 | 10 |
| 10 | 0.58 | 0.61 | 0.61 | 0.61 | 0.62 | 0.59 | 0.61 | 0.61 |
| 11 | 0.69 | 0.69 | 0.7 | 0.69 | 0.71 | 0.7 | 0.71 | 0.71 |
| 12 | 0.81 | 0.81 | 0.81 | 0.89 | 0.8 | 0.8 | 0.79 | 0.8 |
| 13 | 0.86 | 0.89 | 0.89 | 0.92 | 0.89 | 0.91 | 0.89 | 0.89 |

B) Achievable Code Rates by 16-QAM in UL according to Alt-2

| $I_{TBS}$ | Number of RUs | | | | | | | |
|---|---|---|---|---|---|---|---|---|
| | NA | 1 | NA | 2 | NA | 3 | 4 | 5 |
| 10 | — | 0.61 | — | 0.61 | — | 0.59 | 0.61 | 0.61 |
| 11 | — | 0.69 | — | 0.69 | — | 0.7 | 0.71 | 0.71 |
| 12 | — | 0.81 | — | 0.89 | — | 0.8 | 0.79 | 0.8 |
| 13 | — | 0.89 | — | 0.92 | — | 0.91 | 0.89 | 0.89 |

If Alternative 2 (which is a subset of Alternative 1) were implemented to introduce 16-QAM in UL for NB-IoT, then there may need for an indication such as via one or more of processing circuitry 68, processor 70, radio interface 62, indication unit 32, etc., to the wireless device 22 (e.g., through 1-bit in DCI) on whether it has been instructed to use QPSK or 16-QAM, i.e., the wireless device 22 such as via one or more of processing circuitry 84, processor 86, radio interface 82, etc., may receive the indication. This means that when the network node 16 such as via one or more of processing circuitry 68, processor 70, radio interface 62, determination unit 31, indication unit 32, etc., has instructed the wireless device 22 to use QPSK, the legacy TBS table would be fully available and used as is used in existing systems ($I_{MCS}$ from 0 to 13 in steps of 1 together with RUs as per Table 1.1a), whereas when 16-QAM is used, only $I_{MCS}$ from 10 to 13 in steps of 1 would be used along with the RU re-arrangement as illustrated in Table 1.2a.

Performance Comparison of Alternative 1 and Alternative 2

The table below illustrates one-on-one the BLER performance difference between Alternative 1 and Alternative 2.

TABLE 1.3a

| BLER performance comparison of Alternative 1 (Alt-1) and Alternative 2 (Alt-2) | | | | | | | | | |
|---|---|---|---|---|---|---|---|---|---|
| | | | | Number of RUs | | | | | |
| | | | | Alternative 1 | | | | | |
| $I_{TBS}$ | 1 | 1 | 2 | 2 | 3 | 3 | 4 | 5 | |
| | | | | Alternative 2 | | | | | |
| $I_{TBS}$ | — | 1 | — | 2 | — | 3 | 4 | 5 | |

FIGS. 9-12 are examples illustrating the performance comparison between Alt-1 and Alt-2.

The side-by-side comparison of Alt-1 and Alt-2 in FIGS. 9-12 illustrates that in Alt-1, even if the same $I_{TBS}$ (recall $I_{TBS}=I_{MCS}$) is used, there will be large SNR variations when passing from using one RU allocation to another one. On the other hand, in Alt-2 if the same is used, there will be overall no SNR variations when passing from using one RU allocation to another one such as by the wireless device 22. Indeed, the only significant variation is observed when $I_{TBS}=12$ and the number of allocated RUs=2 because the TBS entry being evaluated leads to a higher code rate compared to the ones obtained when a different number of RUs is allocated (See table 1.2c, where, at this point, Alt-1 nor Alt-2 have performed any TBS redistribution).

Even remaining with Alternative 2, in Table 1.3b below, it is illustrated that Alt-2 needs a significantly larger SNR compared to what is required for QPSK.

TABLE 1.3b

| BLER performance comparison between QPSK and Alt-2 | | | | | | | | | |
|---|---|---|---|---|---|---|---|---|---|
| | | | | N_RU 16QAM/QPSK | | | | | |
| | | 1 | 2 | 3 | 4 | 5 | 6 | 8 | 10 | |
| | | | | 16QAM with Re-arranged RUs (16QAM Alt2) | | | | | |
| I_TBS | Modulation | — | 1 | — | 2 | — | 3 | 4 | 5 | Margin(dB) |
| 10 | QPSK | −1.8 | −1.9 | −1.9 | −1.9 | −1.7 | −2.1 | −1.9 | −2 | ~6.2 dB |
| | 16QAM Alt2 | — | 4.2 | — | 4.3 | — | 4.1 | 4.3 | 4.3 | |
| 11 | QPSK | −0.4 | −0.9 | −0.8 | −0.9 | −0.6 | −0.7 | −0.7 | −0.7 | ~6.74 dB |
| | 16QAM Alt2 | — | 5.7 | — | 5.8 | — | 6.1 | 6.1 | 6.1 | |
| 12 | QPSK | 1.1 | 0.7 | 0.7 | 2.2 | 0.6 | 0.5 | 0.4 | 0.5 | ~7.66 dB |
| | 16QAM Alt2 | — | 8 | — | 10.9 | — | 8 | 7.8 | 7.9 | |
| 13 | QPSK | 2.1 | 2.1 | 2 | 3 | 2.2 | 2.6 | 2.1 | 2.1 | ~9 dB |
| | 16QAM Alt2 | — | 10.6 | — | 12.6 | — | 11.9 | 11 | 10.8 | |

To close the SNR gap between QPSK and 16-QAM in UL, it may be possible to perform a power increase such as via one or more of processing circuitry 84, processor 86, radio interface 82, determination unit 34, etc., as to shift the SNR of 16-QAM towards the required SNR for QPSK. In LTE, $\Delta_{TF}$ in the power control equation is used to increase the power when the number of bits per resource element (RE) is increased by a higher order modulation scheme, hence in case of using 16-QAM in UL, a similar element may be incorporated into the NB-IoT's equation below (which is described in wireless communication standards such as in 3GPP TS 36.213 v16.0.0):

The wireless device 22 transmits power $P_{NPUSCH}(i)$ for NPUSCH transmission in NB-IoT UL slot i for the serving cell $_c$ is given by:

For NPUSCH (re)transmissions corresponding to the random access response grant if enhanced random access power control is not applied, and for all other NPUSCH transmissions except for NPUSCH transmission using preconfigured uplink resource, when the number of repetitions of the allocated NPUSCH RUs is greater than 2:

$$P_{NPUSCH,c}(i) = P_{CMAX,c}(i) \ [dBm]$$

otherwise $$P_{NPUSCH,c}(i) = \min\left\{ \begin{array}{l} P_{CMAX,c}(i), \\ 10\log_{10}(M_{NPUSCH,c}(i)) + P_{O\_NPUSCH,c}(j) + \alpha_c(j) \cdot PL_c \end{array} \right\} [dBm]$$

Since in the above equation, the wireless device 22 transmit power is referred to slot i, in one form, Alt-2 could include incorporating $\Delta_{TF,c}(i)=10 \log_{10}(X)$, where X can be an integer number or an integer with fractional part, for example X=2. $\Delta_{TF}$ could also be obtained from simulations, e.g., by using the Margin (dB) found in the Table 1.3b above comparing 16-QAM with re-arranged RUs vs QPSK. For illustration purposes, it is described below the incorporation of $\Delta_{TF}$ into the wireless device 22's transmit power equation used in NB-IoT.

$P_{NPUSCH,c}(i) = \min$ $$\left\{ \begin{array}{l} P_{CMAX,c}(i), \\ 10\log_{10}(M_{NPUSCH,c}(i)) + P_{0\_NPUSCH,c}(j) + \alpha_c(j) \cdot PL_c + \mathbf{\Delta_{TF,c}(i)} \end{array} \right\} \; [dBm]$$

The power boosting solution above, where a new term (in bold) is introduced into the wireless device 22's transmit power equation is compatible and can be adopted for one or more embodiments described herein for introducing 16-QAM in UL for NB-IoT.

Transport Block Redistribution

As described above, Alt-2 could reduce large variations in SNR for a given $I_{MCS}$ and varying number of allocated RUs. However, the performance evaluation described in the "Performance Comparison of Alt-1 and Alt-2" subsection indicates that even when Alt-2 fulfills the above-mentioned design criteria, 16-QAM based on Alt-2 may still require significantly larger SNR (e.g., >6 dB) compared to the one required by QPSK to achieve a 10% BLER Target.

To alleviate the large difference between 16-QAM and QPSK in terms of the SNR required to fulfill a 10% BLER target, a solution based on a Transport Block redistribution (which corresponds to Alternative 3 (Alt-3)) is described in this subsection which consists in keeping unmodified, with respect to QPSK, the number of allocated RUs (i.e., 1, 2, 3, 4, 5, 6, 8, 10), and creating a TBS Table such as for storage at wireless device 22 where some of the existing TBS entries and number of allocated RUs are skipped, some others redistributed and where a set of entries are only used for QPSK whereas the complementary ones are only used for 16-QAM in UL The design target of Alt-3 includes the avoidance of large SNR variations when a given $I_{MCS}$ is selected and the number of allocated RUs is varied, and also avoidance of large SNR variations when a wireless device 22 such as via one or more of processing circuitry 84, processor 86, radio interface 82, determination unit 34, etc., switches from QPSK to 16-QAM in UL and vice versa. To fulfill the above two design criteria in Alt-3, the Transport Block Sizes available in existing systems for a Cat-NB2 device are re-used but redistributed as to have same/similar code rates when a given $I_{MCS}$ is selected and the number of allocated RUs is varied, and code rates of similar order on TBS entries close to the border crossing between QPSK and 16-QAM in UL are achievable. Moreover, the full legacy set of TBS is no longer available for QPSK since the TBS entries associated with $I_{MCS}$=3, 5, 9, 12 and 13 with all their possible allocated RUs were skipped. That is, Alt-3 kept 9 out 14 $I_{MCS}$ indices usable for QPSK such as by re-numbering them so as to start from 0 and finalize/end in 8, whereas $I_{MCS}$ indices from 9 to 13 are the ones used with 16-QAM in UL which consist of a redistribution of available TBS entries for a Cat-NB2 device.

Table 2.2a illustrates as an example (Note: the ultimate selection of the TBS entries may change until finding the optimal performance through simulations) a TBS table to be used for both QPSK and 16-QAM in UL according to Alt-3 such as via one or more of processing circuitry 84, processor 86, radio interface 82, determination unit 34, etc., whereas Table 2.2b shows the achievable code rates respectively achieved by QPSK and 16-QAM on their corresponding parts of the table.

TABLE 2.2a

TBS Table for QPSK and 16-QAM in UL according to Alt-3

| Modulation Scheme | $I_{TBS}$ | Number of RUs | | | | | | | |
|---|---|---|---|---|---|---|---|---|---|
| | | 1 | 2 | 3 | 4 | 5 | 6 | 8 | 10 |
| QPSK only | 0 | 16 | 32 | 56 | 88 | 120 | 152 | 208 | 256 |
| | 1 | 24 | 56 | 88 | 144 | 176 | 208 | 256 | 344 |
| | 2 | 32 | 72 | 144 | 176 | 208 | 256 | 328 | 424 |
| | 3 | 56 | 120 | 208 | 256 | 328 | 408 | 552 | 680 |
| | 4 | 88 | 176 | 256 | 392 | 504 | 600 | 808 | 1000 |
| | 5 | 104 | 224 | 328 | 472 | 584 | 712 | 1000 | 1224 |
| | 6 | 120 | 256 | 392 | 536 | 680 | 808 | 1096 | 1384 |
| | 7 | 144 | 328 | 504 | 680 | 872 | 1000 | 1384 | 1736 |
| | 8 | 176 | 376 | 584 | 776 | 1000 | 1192 | 1608 | 2024 |
| 16-QAM only | 9 | 224 | 488 | 744 | 1000 | 1256 | 1544 | 2024 | 2536 |
| | 10 | 296 | 616 | 936 | 1256 | 1544 | 2024 | 2536 | — |
| | 11 | 392 | 808 | 1256 | 1608 | 2024 | 2536 | — | — |
| | 12 | 440 | 904 | 1352 | 1800 | 2280 | — | — | — |
| | 13 | 488 | 1000 | 1544 | 2024 | 2536 | — | — | — |

TABLE 2.2b

Achievable Code Rates by QPSK and 16-QAM in UL on their corresponding TBS entries according to Alt-3

| Modulation Scheme | $I_{TBS}$ | Number of RUs | | | | | | | |
|---|---|---|---|---|---|---|---|---|---|
| | | 1 | 2 | 3 | 4 | 5 | 6 | 8 | 10 |
| QPSK only | 0 | 0.14 | 0.1 | 0.09 | 0.1 | 0.1 | 0.1 | 0.1 | 0.1 |
| | 1 | 0.17 | 0.14 | 0.13 | 0.15 | 0.14 | 0.13 | 0.12 | 0.13 |
| | 2 | 0.19 | 0.17 | 0.19 | 0.17 | 0.16 | 0.16 | 0.15 | 0.16 |
| | 3 | 0.28 | 0.25 | 0.27 | 0.24 | 0.24 | 0.25 | 0.25 | 0.24 |
| | 4 | 0.39 | 0.35 | 0.32 | 0.36 | 0.37 | 0.36 | 0.36 | 0.36 |

TABLE 2.2b-continued

Achievable Code Rates by QPSK and 16-QAM in UL on their corresponding TBS entries according to Alt-3

| Modulation Scheme | $I_{TBS}$ | Number of RUs | | | | | | | |
|---|---|---|---|---|---|---|---|---|---|
| | | 1 | 2 | 3 | 4 | 5 | 6 | 8 | 10 |
| | 5 | 0.44 | 0.43 | 0.41 | 0.43 | 0.42 | 0.43 | 0.44 | 0.43 |
| | 6 | 0.5 | 0.49 | 0.48 | 0.49 | 0.49 | 0.48 | 0.49 | 0.49 |
| | 7 | 0.58 | 0.61 | 0.61 | 0.61 | 0.62 | 0.59 | 0.61 | 0.61 |
| | 8 | 0.69 | 0.69 | 0.7 | 0.69 | 0.71 | 0.7 | 0.71 | 0.71 |
| 16-QAM only | 9 | 0.43 | 0.44 | 0.44 | 0.44 | 0.44 | 0.45 | 0.44 | 0.44 |
| | 10 | 0.56 | 0.56 | 0.56 | 0.56 | 0.54 | 0.59 | 0.56 | — |
| | 11 | 0.72 | 0.72 | 0.74 | 0.71 | 0.71 | 0.74 | — | — |
| | 12 | 0.81 | 0.80 | 0.80 | 0.79 | 0.80 | — | — | — |
| | 13 | 0.89 | 0.89 | 0.91 | 0.89 | 0.89 | — | — | — |

If Alt-3 is implemented in 16-QAM in UL for NB-IoT, there is no need to introduce an indication to the wireless device 22 to use QPSK or 16-QAM. This means that with Alt-3 as long as the 16-QAM feature is enabled, the wireless device such as via one or more of processing circuitry 84, processor 86, radio interface 82, determination unit 34, etc., will refer to/use a TBS table (e.g., Table 2.2a) containing TBS entries for both QPSK and 16-QAM in UL, where the selection of the modulation order would be implicitly provided through the indices $I_{MCS}$ and $I_{RU}$ in the DCI which point out to a particular TBS entry of the TBS table.

Time-Domain Resource Assignment Rearrangement Together With Transport Block Redistribution With Alternative 4 (Alt-4), a slight variant to Alt-3 is introduced by allocating, for 16-QAM, half the number of RUs available for QPSK when the number of RUs is >=6, which helps ensure that for a given TBS usable with 16-QAM, the time-domain resource utilization is kept to the minimum. In one or more embodiments, for a given TBS using Alt-3, in some cases, 16-QAM can use either half or twice the number of allocated RUs.

Table 3.3a illustrates as an example a TBS table to be used for both QPSK and 16-QAM in UL according to Alt-4, whereas Table 3.3b shows the achievable code rates respectively achieved by QPSK and 16-QAM on their corresponding parts of the table. In one or more embodiments, the ultimate/final selection of the TBS entries may change until finding the optimal performance through simulations.

TABLE 3.3a

TBS Table for QPSK and 16-QAM in UL according to Alt-4

| Modulation Scheme | $I_{TBS}$ | Number of RUs | | | | | | | |
|---|---|---|---|---|---|---|---|---|---|
| | | 1 | 2 | 3 | 4 | 5 | 6 | 8 | 10 |
| QPSK only | 0 | 16 | 32 | 56 | 88 | 120 | 152 | 208 | 256 |
| | 1 | 24 | 56 | 88 | 144 | 176 | 208 | 256 | 344 |
| | 2 | 32 | 72 | 144 | 176 | 208 | 256 | 328 | 424 |
| | 3 | 56 | 120 | 208 | 256 | 328 | 408 | 552 | 680 |
| | 4 | 88 | 176 | 256 | 392 | 504 | 600 | 808 | 1000 |
| | 5 | 104 | 224 | 328 | 472 | 584 | 712 | 1000 | 1224 |
| | 6 | 120 | 256 | 392 | 536 | 680 | 808 | 1096 | 1384 |
| | 7 | 144 | 328 | 504 | 680 | 872 | 1000 | 1384 | 1736 |
| | 8 | 176 | 376 | 584 | 776 | 1000 | 1192 | 1608 | 2024 |
| 16-QAM only | 9 | 224 | 488 | 744 | 1000 | 1256 | — | — | — |
| | 10 | 296 | 616 | 936 | 1256 | 1544 | — | — | — |
| | 11 | 392 | 808 | 1256 | 1608 | 2024 | — | — | — |
| | 12 | 440 | 904 | 1352 | 1800 | 2280 | — | — | — |
| | 13 | 488 | 1000 | 1544 | 2024 | 2536 | — | — | — |

TABLE 3.3b

Achievable Code Rates by QPSK and 16-QAM in UL on their corresponding TBS entries according to Alt-4

| Modulation Scheme | $I_{TBS}$ | Number of RUs | | | | | | | |
|---|---|---|---|---|---|---|---|---|---|
| | | 1 | 2 | 3 | 4 | 5 | 6 | 8 | 10 |
| QPSK only | 0 | 0.14 | 0.1 | 0.09 | 0.1 | 0.1 | 0.1 | 0.1 | 0.1 |
| | 1 | 0.17 | 0.14 | 0.13 | 0.15 | 0.14 | 0.13 | 0.12 | 0.13 |
| | 2 | 0.19 | 0.17 | 0.19 | 0.17 | 0.16 | 0.16 | 0.15 | 0.16 |
| | 3 | 0.28 | 0.25 | 0.27 | 0.24 | 0.24 | 0.25 | 0.25 | 0.24 |
| | 4 | 0.39 | 0.35 | 0.32 | 0.36 | 0.37 | 0.36 | 0.36 | 0.36 |
| | 5 | 0.44 | 0.43 | 0.41 | 0.43 | 0.42 | 0.43 | 0.44 | 0.43 |
| | 6 | 0.5 | 0.49 | 0.48 | 0.49 | 0.49 | 0.48 | 0.49 | 0.49 |

TABLE 3.3b-continued

Achievable Code Rates by QPSK and 16-QAM in UL on their corresponding TBS entries according to Alt-4

| Modulation Scheme | $I_{TBS}$ | Number of RUs | | | | | | | |
|---|---|---|---|---|---|---|---|---|---|
| | | 1 | 2 | 3 | 4 | 5 | 6 | 8 | 10 |
| | 7 | 0.58 | 0.61 | 0.61 | 0.61 | 0.62 | 0.59 | 0.61 | 0.61 |
| | 8 | 0.69 | 0.69 | 0.7 | 0.69 | 0.71 | 0.7 | 0.71 | 0.71 |
| 16-QAM only | 9 | 0.43 | 0.44 | 0.44 | 0.44 | 0.44 | — | — | — |
| | 10 | 0.56 | 0.56 | 0.56 | 0.56 | 0.54 | — | — | — |
| | 11 | 0.72 | 0.72 | 0.74 | 0.71 | 0.71 | — | — | — |
| | 12 | 0.81 | 0.80 | 0.80 | 0.79 | 0.80 | — | — | — |
| | 13 | 0.89 | 0.89 | 0.91 | 0.89 | 0.89 | — | — | — |

Alt-4 may be considered a subcase of Alt-3. For example, with Alt-3, it is possible to use 16-QAM to transmit a TBS equal to 2536 bits using either 10 RUs or 5RUs, whereas with Alt-4 the TBS equal to 2536 bits may always be transmitted using 5 RUs.

If Alt-4 were implemented such as via one or more of processing circuitry 84, processor 86, radio interface 82, determination unit 34, etc., to introduce 16-QAM in UL for NB-IoT, there is no need to introduce an indication to the wireless device 22 to use QPSK or 16-QAM. This means that with Alt-4, as long as the 16-QAM feature is enabled, the wireless device 22 such as via one or more of processing circuitry 84, processor 86, radio interface 82, determination unit 34, etc., will refer to a TBS table (e.g., Table 3.3a) containing TBS entries for both QPSK and 16-QAM in UL, where the selection of the modulation order would be implicitly given through the indices $I_{MCS}$ and $I_{RU}$ in the DCI which point out to a particular TBS entry of the TBS table.

Time-Domain Resource Assignment Rearrangement And Transport Blocks Redistribution To Introduce 16-QAM In DL The subsections above described various methods/process/solutions for incorporating 16-QAM in UL for NB-IoT. The "5.4 Time-domain resource assignment rearrangement and Transport Blocks redistribution to introduce 16-QAM in DL" subsection describes how the concepts/principles in the above subsections can be used to introduce 16-QAM in DL for NB-IoT.

The following bullets describe what would be different if the same solutions described for UL were adopted in DL.

Time-Domain Resource Assignment rearrangement:
  The design principles described in subsections: alternative 1, alternative 2 and "performance comparison of Alt-1 and Alt 2" can be adopted in DL, being the number of allocated subframes for NPDSCH, the time-domain resources that would be reduced, e.g., half with respect to the ones allocated when QPSK is used. Table 16.4.1.3-1 of 3GPP TS 36.213 v16.0.0 may be used as reference to perform the Time-Domain Resource Assignment rearrangement.
Transport Block redistribution:
  The design principles described in the "Transport Block redistribution" subsection for Alt-3 can be adopted in DL, being Table 16.4.1.5.1-1 of 3GPP TS 36.213 v16.0.0, the one used as a reference to perform the Transport Block redistribution.
Time-Domain Resource Assignment rearrangement together with Transport Block redistribution.
  The design principles described in the "Time-Domain Resource Assignment rearrangement together with Transport Block redistribution" subsection for Alt-4 can be adopted in DL, being Table 16.4.1.3-1 used as reference to perform the Time-Domain Resource Assignment rearrangement and Table 16.4.1.5.1-1 of 3GPP TS 36.213 v16.0.0, the one used as a reference to perform the Transport Block redistribution.

Moreover, any of one or more embodiments described above (i.e., Alt-1, Alt-2, Alt-3 or Alt-4) can be adopted for introducing 16-QAM for NB-IoT in DL accounting for the differences in terms of deployment-modes. Further, one or more of the embodiments described herein (i.e., Alt-2, Alt-3, Alt-4) it will be possible to increase the DL throughput without having to introduce a TBS larger than the maximum that is supported in existing systems for a Cat-NB2 device.

Therefore, the present disclosure describes one or more embodiments for supporting 16-QAM for unicast in UL and DL for NB-IoT, as described below:

Time-Domain Resource Assignment rearrangement:
  16-QAM for unicast in UL: When 16-QAM is used, the number of allocated Resource Units is reduced by, e.g., half with respect to the ones allocated when QPSK is used.
    To reduce the gap in terms of required SNR between QPSK and 16-QAM, a new component, e.g., a power delta, can be added to wireless device 22's transmit power control equation in NB-IoT as to boost the power by X dB when 16-QAM is used.
  16-QAM for unicast in DL: When 16-QAM is used, the number of allocated subframes for NPDSCH is reduced by, e.g., half with respect to the ones allocated when QPSK is used.
Transport Block redistribution:
  16-QAM for unicast in UL: When 16-QAM is used, TBS entries selected by ($I_{TBS}$, $I_{RU}$) do not have the same location (i.e., ($I_{TBS}$, $I_{RU}$) position) as in the TBS Table used for QPSK whereas some other ones would be skipped.
  16-QAM for unicast in DL: When 16-QAM is used, TBS entries selected by ($I_{TBS}$, $I_{SF}$) do not have the same location (i.e., ($I_{TBS}$, $I_{SF}$) position) as in the TBS Table used for QPSK whereas some other ones would be skipped.
Time-Domain Resource Assignment rearrangement together with Transport Block redistribution.
  16-QAM for unicast in UL: When 16-QAM is used, the number of allocated Resource Units (RUs) is reduced (by e.g., half), and the TBS entries selected by ($I_{TBS}$, $I_{RU}$) do not have the same location (i.e., ($I_{TBS}$, $I_{RU}$) position) as in the TBS Table used for QPSK.
  16-QAM for unicast in DL: When 16-QAM is used, the number of allocated subframes for NPDSCH is reduced (by e.g., half), and the TBS entries selected by ($I_{TBS}$, $I_{RU}$) do not have the same location (i.e., ($I_{TBS}$, $I_{RU}$) position) as in the TBS Table used for QPSK.

In an embodiment, a network node is configured to communicate with a wireless device. The network node is configured to, and/or comprises a radio interface and/or comprises processing circuitry configured to:
   support 16-quadrature amplitude modulation (16-QAM) based communication based on at least one of:
      time-domain resource assignment rearrangement; and
      transport block redistribution.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the present disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the present disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A method performed by a network node configured to communicate with a wireless device, the method comprising:
   determining a resource allocation for 16-quadrature amplitude modulation, 16-QAM, based communication for the wireless device; and
   indicating, to the wireless device, one or both of a transport block size, TBS, and a number of allocated time-domain resources that are associated with the determined resource allocation using a TBS index and a time-domain resource index, the TBS index and the time-domain resource index being determined in accordance with a table for allocating one of transport blocks and number of allocated time-domain resources for the 16-QAM based communication,
   the table for allocating one of transport blocks and the number of allocated time-domain resources for the 16-QAM based communication corresponding to a time domain resource assignment (TDRA) rearrangement with respect to a table for allocating one or more of transport blocks and a number of allocated time-domain resources defined for a quadrature phase shift keying (QPSK) based communication, and the one or both of the TBS and the number of allocated time-domain resources being determined using the TBS index and the time-domain resource index that is corresponding to a reduced number of allocated time-domain resources compared to a number of allocated time-domain resources corresponding to the same TBS as required in the table for allocating one of transport blocks and the number of allocated time-domain resources defined for the QPSK based communication.

2. The method of claim 1, further comprising:
transmitting, to the wireless device, an indication to use 16-QAM.

3. The method of claim 1, wherein
the TBS is indicated using the TBS index and the time-domain resource index that are respectively different from those indicating the same TBS as required in the table for allocating one of transport blocks and the number of allocated time-domain resources defined for the QPSK based communication, wherein the time-domain resource index corresponds to a reduced number of allocated time-domain resources compared to a number of allocated time-domain resources corresponding to the same TBS as required in the table for allocating one of transport blocks and the number of allocated time-domain resources defined for the QPSK based communication.

4. The method of claim 3, wherein the transport block redistribution with respect to the table for allocating one of transport blocks and the number of allocated time-domain resources defined for the QPSK based communication comprises:
one or more TBSs corresponding to a first subset of the TBS indices in the table for allocating transport blocks and/or number of allocated time-domain resources defined for the QPSK based communication being reused for the 16-QAM based communication but each being indicated by one or both of a TBS index and a time-domain resource index that are respectively different from those indicating the same TBS as required in the table for allocating one of transport blocks and the number of allocated time-domain resources defined for the QPSK based communication; and optionally
one or more TBSs in the table for allocating one of transport blocks and the number of allocated time-domain resources defined for the QPSK based communication being skipped for the 16-QAM based communication, the one or more skipped TBSs corresponding to a second subset of TBS indices in the table for allocating one of transport blocks and the number of allocated time-domain resources defined for the QPSK based communication; and
one or more TBSs corresponding to a third subset of the TBS indices in the table for allocating one of transport blocks and the number of allocated time-domain resources defined for the QPSK based communication being used for the QPSK based communication.

5. The method of claim 1, wherein in a case where the 16-QAM based communication is used for downlink, the time-domain resource index corresponds to the number of allocated subframes, and the method further comprises:
switching to a 16-QAM based downlink communication from a QPSK based downlink communication according to the determined resource allocation, in which the same TBS as that defined for the QPSK based downlink communication is allocated for the 16-QAM based downlink communication along with a reduced number of allocated subframes corresponding to the same TBS as required for one or both of allocating transport blocks and number of allocated subframes defined for the QPSK based downlink communication to reduce signal to noise ratio, SNR, variation between the QPSK based downlink communication and the 16-QAM based downlink communication.

6. The method of claim 5, further comprising:
transmitting a 16-QAM based downlink transmission to the wireless device, using a reduced number of allocated subframes compared to a number of allocated subframes corresponding to the same TBS as required for allocating one of transport blocks and the number of allocated subframes defined for a QPSK based downlink communication.

7. A method performed by a wireless device configured to communicate with a network node, the method comprising:
receiving, from the network node, indications of a transport block size (TBS) index and a time-domain resource index;
determining one or both of a TBS and a number of allocated time-domain resources using the received TBS index and time-domain resource index in accordance with a table for allocating one of transport blocks and a number of allocated time-domain resources for 16-quadrature amplitude modulation, 16-QAM, based communication to obtain a resource allocation for the 16-QAM based communication for the wireless device, the table for allocating one of transport blocks and the number of allocated time-domain resources for the 16-QAM based communication corresponding to a time domain resource (TDRA) rearrangement with respect to a table for allocating one or more of transport blocks and a number of allocated time-domain resources defined for a quadrature phase shift keying (QPSK) based communication; and
the one or both of the TBS and the number of allocated time-domain resources being determined using the TBS index and the time-domain resource index that is corresponding to a reduced number of allocated time-domain resources compared to a number of allocated time-domain resources corresponding to the same TBS as required in the table for allocating one or more of transport blocks and the number of allocated time-domain resources defined for the QPSK based communication.

8. The method of claim 7, further comprising:
receiving, from the network node, an indication to use 16-QAM.

9. The method of claim 7, wherein the one or both of the TBS and the number of allocated time-domain resources are determined using the TBS index and the time-domain resource index that are respectively different from those indicating the same TBS as required in the table for allocating one of transport blocks and the number of allocated time-domain resources defined for the QPSK based communication, wherein the time-domain resource index corresponds to a reduced number of allocated time-domain resources compared to a number of allocated time-domain resources corresponding to the same TBS as required in one or both of the table the number of allocated time-domain resources for allocating transport blocks defined for the QPSK based communication.

10. The method of claim 9, wherein the transport block redistribution with respect to the table for allocating one of transport blocks and the number of allocated time-domain resources defined for the QPSK based communication comprises:
- one or more TBSs corresponding to a first subset of the TBS indices in the table for allocating one of transport blocks and the number of allocated time-domain resources defined for the QPSK based communication being reused for the 16-QAM based communication but each being indicated by one or both of a TBS index and a resource index that are respectively different from those time-domain indicating the same TBS as required in the table for allocating one of transport blocks and the number of allocated time-domain resources defined for the QPSK based communication; and optionally
- one or more TBSs in the table for allocating transport blocks and/or number of allocated time-domain resources defined for the QPSK based communication being skipped for the 16-QAM based communication, the one or more skipped TBSs corresponding to a second subset of TBS indices in the table for allocating one of transport blocks and the number of allocated time-domain resources defined for the QPSK based communication; and optionally
- one or more TBSs corresponding to a third subset of the TBS indices in the table for allocating transport blocks and/or number of allocated time-domain resources defined for the QPSK based communication being used for the QPSK based communication.

11. The method of claim 7, wherein in a case where the 16-QAM based communication is used for uplink, the time-domain resource index corresponds to the number of allocated time-domain resource units further comprising:
- switching to a 16-QAM based uplink communication from a QPSK based uplink communication according to the obtained resource allocation, in which the same TBS as that defined for the QPSK based uplink communication is allocated for the 16-QAM based uplink communication along with a reduced number of allocated time-domain resource units corresponding to the same TBS as required for allocating one or both of transport blocks and number of allocated time-domain resource units defined for the QPSK based uplink communication to reduce signal to noise ratio, SNR, variation between the QPSK based uplink communication and the 16-QAM based uplink communication.

12. The method of claim 11, further comprising:
- transmitting a 16-QAM based uplink transmission to the network node, using a reduced number of allocated time-domain resource units compared to a number of allocated time-domain resource units corresponding to the same TBS as required for allocating one or both of transport blocks and the number of allocated time-domain resource units defined for a QPSK based uplink communication.

13. The method of claim 11, further comprising:
- performing power boosting by adding a power delta in calculation of a transmit power of the wireless device to reduce a gap in terms of a required signal to noise ratio, SNR, between the QPSK based uplink communication and the 16-QAM based uplink communication.

14. The method of claim 13, further comprising:
- receiving a 16-QAM based downlink transmission from the network node, using a reduced number of allocated subframes compared to a number of allocated subframes corresponding to the same TBS as required for allocating one or both of transport blocks and the number of allocated subframes defined for a QPSK based downlink communication.

15. The method of claim 7, wherein in a case where the 16-QAM based communication is used for downlink, the time-domain resource index corresponds to the number of allocated subframes further comprises:
- switching to a 16-QAM based downlink communication from a QPSK based downlink communication according to the obtained resource allocation, in which the same TBS as that defined for the QPSK based downlink communication is allocated for the 16-QAM based downlink communication along with a reduced number of allocated subframes corresponding to the same TBS as required for allocating one or both of transport blocks and the number of allocated subframes defined for the QPSK based downlink communication to reduce signal to noise ratio, SNR, variation between the QPSK based downlink communication and the 16-QAM based downlink communication.

16. A network node, comprising:
- at least one processor, and
- at least one memory, storing instructions which, when executed on the at least one processor, cause the network node to:
- determine a resource allocation for 16-quadrature amplitude modulation, 16-QAM, based communication for a wireless device; and
- indicate, to the wireless device, one or both of a transport block size, TBS, and a number of allocated time-domain resources that are associated with the determined resource allocation using a TBS index and a time-domain resource index, the TBS index and the time-domain resource index being determined in accordance with a table for allocating one of transport blocks and a number of allocated time-domain resources for the 16-QAM based communication, the table for allocating one of transport blocks and the number of allocated time-domain resources for the 16-QAM based communication corresponding to a time-domain resource assignment, TDRA, rearrangement with respect to a table for allocating one or more of transport blocks and a number of allocated time-domain resources defined for a quadrature phase shift keying, QPSK, based communication; and
- the one or both of the TBS and the number of allocated time-domain resources being determined using the TBS index and the time-domain resource index that is corresponding to a reduced number of allocated time-domain resources compared to a number of allocated time-domain resources corresponding to the same TBS as required in the table for allocating one of transport blocks and the number of allocated time-domain resources defined for the QPSK based communication.

17. The network node of claim 16, wherein the instructions, when executed on the at least one processor, further cause the network node to transmit, to the wireless device, an indication to use 16-QAM.

18. A wireless device, comprising:
- at least one processor, and
- at least one memory, storing instructions which, when executed on the at least one processor, cause the wireless device to:
- receive, from the network node, indications of a transport block size (TBS) index and a time-domain resource index;
- determine one or both of a TBS and a number of allocated time-domain resources using the received TBS index and time-domain resource index in accordance with a table for allocating one of transport blocks and a number of allocated time-domain resources for 16-quadrature amplitude modulation, 16-QAM, based communication to obtain a resource allocation for the 16-QAM based communication for the wireless device, the table for allocating one of transport blocks and the number of allocated time-domain resources for the 16-QAM based communication corresponds to a time domain resource (TDRA) rearrangement with respect to a table for allocating one or more of transport blocks and a number of allocated time-domain resources defined for a quadrature phase shift keying (QPSK) based communication; and the one or both of the TBS and the number of allocated time-domain resources are determined using the TBS index and the time-domain resource index that is corresponding to a reduced number of allocated time-domain resources compared to a number of allocated time-domain resources corresponding to the same TBS as required in the table for allocating one of transport blocks and the number of allocated time-domain resources defined for the QPSK based communication.

19. The wireless device of claim 18, wherein the instructions, when executed on the at least one processor, further cause the wireless device to receive, from the network node, an indication to use 16-QAM.

20. A computer readable non-transitory storage medium having computer program instructions stored thereon, the computer program instructions, when executed by at least one processor, cause the at least one processor to:

determine a resource allocation for 16-quadrature amplitude modulation, 16-QAM, based communication for the wireless device; and indicate, to a wireless device, one or both of a transport block size, TBS, and a number of allocated time-domain resources that are associated with the determined resource allocation using a TBS index and a time-domain resource index, the TBS index and the time-domain resource index being determined in accordance with a table for allocating one of transport blocks and number of allocated time-domain resources for the 16-QAM based communication, the table for allocating one of transport blocks and the number of allocated time-domain resources for the 16-QAM based communication corresponding to a time domain resource assignment (TDRA) rearrangement with respect to a table for allocating one or more of transport blocks and a number of allocated time-domain resources defined for a quadrature phase shift keying (QPSK) based communication, and the one or both of the TBS and the number oof allocated time-domain resources being determined using the TBS index and the time-domain resource index that is corresponding to a reduced number of allocated time-domain resources compared to a number of allocated time-domain resources corresponding to the same TBS as required in the table for allocating one of transport blocks and the number of allocated time-domain resources defined for the QPSK based communication.

* * * * *